United States Patent [19]
Usami et al.

[11] Patent Number: 5,844,699
[45] Date of Patent: Dec. 1, 1998

[54] COLOR IMAGE PROCESSING APPARATUS

[75] Inventors: Akihiro Usami, Yokohama; Ken-ichi Ohta, Kawasaki; Yoshiko Horie, Tokyo; Takashi Kawai, Yokohama; Seita Shono, Warabi; Eiji Ohta, Fujisawa, all of Japan

[73] Assignee: Canon Kabushiki Kaisha, Tokyo, Japan

[21] Appl. No.: 471,881

[22] Filed: Jun. 7, 1995

Related U.S. Application Data

[62] Division of Ser. No. 460,090, Jun. 2, 1995, which is a continuation of Ser. No. 792,154, Nov. 14, 1991, abandoned.

[30] Foreign Application Priority Data

| Nov. 15, 1990 | [JP] | Japan | 2-307248 |
|---|---|---|---|
| Nov. 15, 1990 | [JP] | Japan | 2-307249 |
| Nov. 15, 1990 | [JP] | Japan | 2-307250 |
| Nov. 16, 1990 | [JP] | Japan | 2-308491 |
| Nov. 16, 1990 | [JP] | Japan | 2-308492 |
| Nov. 16, 1990 | [JP] | Japan | 2-308493 |
| Dec. 18, 1990 | [JP] | Japan | 2-403313 |

[51] Int. Cl.$^6$ ...................................... H04N 1/46
[52] U.S. Cl. .......................... 358/518; 358/522; 358/523
[58] Field of Search .................... 358/500, 501, 358/518, 519, 520, 522, 523, 524, 530, 537, 538; 382/167, 168

[56] References Cited

U.S. PATENT DOCUMENTS

| 4,414,635 | 11/1983 | Gast et al. | 358/515 |
|---|---|---|---|
| 4,731,662 | 3/1988 | Udagawa et al. | 358/75 |
| 4,843,379 | 6/1989 | Stansfield | 340/701 |
| 4,843,458 | 6/1989 | Ito | 358/80 |
| 4,879,595 | 11/1989 | Niki | 358/500 |
| 4,992,861 | 2/1991 | D'Errico | 358/500 |
| 5,107,332 | 4/1992 | Chan | 358/518 |
| 5,181,105 | 1/1993 | Udagawa | 358/520 |
| 5,185,661 | 2/1993 | Ng | 358/75 |
| 5,234,370 | 8/1993 | Yamaguchi | 358/518 |
| 5,239,370 | 8/1993 | Yamaguchi | 358/518 |
| 5,243,414 | 9/1993 | Dalrymple et al. | 358/518 |
| 5,299,291 | 3/1994 | Ruetz | 358/518 |
| 5,371,609 | 12/1994 | Suzuki et al. | 358/448 |

FOREIGN PATENT DOCUMENTS

| 0142975 | 5/1985 | European Pat. Off. | H04N 1/46 |
|---|---|---|---|
| 0321983 | 6/1989 | European Pat. Off. | H04N 1/46 |
| 0325395 | 7/1989 | European Pat. Off. | H04N 1/46 |
| 0327278 | 8/1989 | European Pat. Off. | H04N 1/46 |
| 0354490 | 2/1990 | European Pat. Off. | H04N 1/46 |
| 0371389 | 6/1990 | European Pat. Off. | H04N 1/46 |
| 0449328 | 10/1991 | European Pat. Off. | H04N 1/40 |
| 3447472 | 7/1985 | Germany | H04N 1/46 |
| 3609049 | 10/1986 | Germany | H04N 1/46 |
| 2194706 | 3/1988 | United Kingdom | H04N 1/46 |

OTHER PUBLICATIONS

"Background Information Post Script Level 2 And Tek Color Technology", Tektronix, Jul. 1991, pp. 1–7.

P. McManus, et al., "A Method For Matching Hard Copy Color To Display Color", SID 1985 Digest, pp. 204–206.

(List continued on next page.)

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image conversion apparatus for image-converting input color image signals, and outputting the converted signals to an output apparatus, allows execution of a plurality of different color processing operations, checks if an input color image falls within a color reproduction region of the output apparatus, and changes the color conversion processing result to be output depending on whether or not the input color image falls within the color reproduction region of the output apparatus. For example, when the input color image falls within the color reproduction region of the output apparatus, color reproduction color-matched with input color image signals is performed. When the input color image falls outside the reproduction region, color reproduction is performed by color conversion processing assuring highest color reproducibility.

21 Claims, 20 Drawing Sheets

OTHER PUBLICATIONS

B. Lindbloom, "Accurate Color Reproductions For Computer Graphics Applications", Computer Graphics, vol. 23, No. 3, Jul. 1989, pp. 117–124.

Gentile, et al., "Digital Display And Printing Of Color Images Based On Uniform Color Space".

J. Meyer, et al., "Color Gamut Matching For Hard Copy", SID International Symposium, Digest of Technical Papers, vol. XX.

R.S. Gentile, et al., "A Comparison of Techniques For Color Gamut Mismatch Compensation", Journal of Imaging Technology, vol. 16, No. 5, Oct. 1990, pp. 176–181.

SID International Symposium, Digest of Technical Papers, vol. XX, "Color Gamut Matching for Hard Copy", John Meyer & Brian Barth.

Journal of Imaging Technology, vol. 16, No. 5, Oct. 1990, pp. 176–181, "A Comparison of Techniques for Color Gamut Mismatch Compensation", R.S. Gentile, E. Walowit, and J.P. Allebach.

Tektronix Background Information Post Script Level Z and Tek Color Technology Jul. 1991, pp. 1–7.

"A Method for Matching Hardcopy Color to Display Color" Paul McManus et al SID 1985.

Computer Graphics vol. 23 No. 3 Jul. 1989. Accurate Color Reproduction for Computer Graphics Applications.

"Digital Displays and Printing of Color Images Based on Uniform Color Space" Gentile et al.

COLOR IMAGE PROCESSING APPARATUS

This application is a division of application Ser. No. 08/460,090, filed Jun. 2, 1995, pending, which was a continuation of application Ser. No. 07/772,154, filed Nov. 14, 1991, now abandoned.

BACKGROUND OF THE INVENTION

1. Field of the Invention

The present invention relates to a color image processing apparatus for converting an input color image signal into an output color image signal, and outputting the output color image to an output apparatus for processing the converted color signal and, more particularly, to a color image processing apparatus for converting an input color image signal based on an additive color process into a color image signal based on a subtractive color process.

2. Description of the Prior Art

In a conventional color image copying apparatus, as shown in FIG. 19, R, G, and B digital image signals based on the additive color process and input by an image input apparatus 401 are converted into color image signals based on the subtractive color process through a log conversion circuit 402, a masking circuit 403, and a blackening/UCR circuit 404. The converted image signals are printed with toners or inks by an image output apparatus 405.

More specifically, the log conversion circuit 402 converts the R, G, and B signals into cyan (C), magenta (M), and yellow (Y) as complementary colors.

The masking circuit 403 serves as a matrix calculation circuit for correcting unnecessary absorption of an ink or toner printed by the image output apparatus 405. The blackening/UCR circuit 404 replaces equivalent neutral components in Y, M, and C color signals into a black (K) signal.

R, G, and B digital image signals based on the additive color process and input by the image input apparatus 401 are converted into color image signals based on the subtractive color process through the log conversion circuit 402, the masking circuit 403, and the blackening/UCR circuit 404. The converted image signals are supplied to the image output apparatus 405, and are printed with inks or toners as color images.

In general, colors of a printed matter or a photograph as a color image original, or an image displayed on a CRT are distributed in wider region on a color spatial coordinate system than a color reproduction region obtained by mixing toners or inks of an image output apparatus.

In order to realize optimal color reproduction for all the colors of input color image signals, compression processing on a color space is usually executed for providing a gradation characteristic also to colors outside the color reproduction region.

More specifically, color reproduction outside the color reproduction region is projected onto the color reproduction region, and in order to provide a gradation characteristic to an image, compression mapping of a color space is performed. As a result, colors are reproduced to be slightly different from original colors.

FIG. 20 shows conventional compression mapping on the color space (on the a*–b* coordinate system). In FIG. 20, a region surrounded by a solid curve represents a color space region of a color image original, and a dotted curve inside the solid curve represents the color reproduction region of the image output apparatus. FIG. 20 reveals that an input color original exceeds the color reproduction region of the image output apparatus.

Conventionally, color reproduction outside the color reproduction region is projected onto the color reproduction region, as indicated by arrows. In order to provide a gradation characteristic to the image, colors are reproduced to be slightly different from original colors, as indicated by arrows. In other words, compression mapping of the color space is performed.

Otherwise, all the images that exceed the color reproduction region of an output apparatus such as a printer, are subject to the same color conversion processing regardless of input image signals.

Other problems in the prior art is that, even when the color spatial distribution of a color image original is within the color reproduction region of the image output apparatus, and the reproduction of the same colors as the original colors is possible, compression-mapped reproduction colors are undesirably obtained, which are different from original colors.

When a color image original is an output image from a copying apparatus or an image output apparatus (to be referred to as a grandchild copy or a generation copy hereinafter), further compressed reproduction colors are obtained. Upon repetition of grandchild copy, reproduction colors are compressed repeatedly, and become further different from those of an image original.

The arrows in FIG. 20 represent traces of reproduction colors.

Furthermore, in an original image wherein the color spatial distribution of a color image original is within the color reproduction region of the image output apparatus, and gradation-expression is made within a small region on the space, e.g. in a gradational contour presentation of mountains or seas on the map, the gradation characteristic may disappear by compressed reproduction.

Other shortcoming of the prior art is that, since images exceeding the color reproduction region of the output apparatus are subject to the same processing regardless of extent of excess color reproduction may be impaired in view of the gradation characteristic, or gradation may disappear.

SUMMARY OF THE INVENTION

The present invention has been made to solve the above-mentioned problems. More specifically, the present invention has been made to achieve the following objects.

It is an object of the present invention to perform color reproduction in accordance with the distribution of colors of an original on a color space, and the color reproduction region of the output apparatus.

It is another object of the present invention to perform above-described color reproduction at high speed.

It is still another object of the present invention with a simple construction.

It is still another object of the present invention to improve the quality of a generation copy.

It is still another object of the present invention to provide an image processing apparatus, which comprises, as an arrangement of a color reproduction processing system for a color image original, in addition to a conventional color space compression mapping reproduction system, a color reproduction system capable of performing reproduction of the same colors as the original color image as to colors within a color reproduction region of an image output apparatus, so that a processing system can be selected in accordance with the distribution of colors of an original on a color space coordinate system upon reading of the original, and optimal color reproduction can be realized according to originals.

It is another object of the present invention to provide an image processing apparatus, which counts the number of colors of input signals, and the number of post-processing colors, and selects color conversion processing, which, for example, can minimize a decrease in the number of colors, in accordance with the count results, so that optimal conversion processing can be executed in accordance with an input image, and the best outputs can be obtained.

Furthermore, it is still another object of the present invention to provide an image processing apparatus, which has parameter groups of color reproduction processing of a color input image not only for one color space compression mapping reproduction system but also for a plurality of compression ratios, and selects a parameter group for an optimal compression ratio in accordance with the distribution of colors of input color image signals in the color space, or selects a parameter group for an optimal compression ratio in accordance with a distance between the color space coordinate system of input color image signals and the barycentric coordinate system of the color reproduction region of an output apparatus, thereby realizing better color reproduction.

It is still another object of the present invention to provide an image processing apparatus, which directly executes, e.g., conversion processing of input color image signals based on the additive color process and color-separated by CCDs so as to determine whether or not the input signals are those allowing image formation, and can realize optimal color reproduction according to the determination result. For example, when it is determined that image formation is enabled, the image processing apparatus directly converts the input image signals into color image signals based on the subtractive color process with reference to, e.g., a density conversion table. Contrary to this, when it is determined that image formation of the input color image signals based on the additive color process is difficult to perform, the input image signals are processed by, e.g., conventional masking processing. In this manner, a processing system can be selected in accordance with the distribution of colors of an original on the color space coordinate system, and optimal color reproduction can be realized according to the original.

It is still another object of the present invention to provide an image processing apparatus, which can select an optimal color image processing system in accordance with the distribution of colors of input color image signals on a color space coordinate system, and can realize optimal color reproduction in accordance with the input color image signals.

It is still another object of the present invention to provide an image processing apparatus, which comprises, as an arrangement of a color reproduction processing system for a color image original, a color reproduction system capable of performing color reproduction color-matched with a color image original only within a color reproduction region of an image output apparatus in addition to a conventional color space compression mapping reproduction system, so that a processing system can be selected in accordance with the distribution of colors of an original on a color space coordinate system upon reading of the original, and optimal color reproduction can be realized according to originals.

As means for achieving the above objects, the image processing apparatus comprises the following arrangement.

More specifically, the image processing apparatus comprises color reproduction region storage means for storing a color reproduction region of an output apparatus on a color space, and conversion means for converting input color image signals obtained by reading a color image original, into output color image signals by at least two kinds of methods depending on whether or not the input color image signals are within the color reproduction region stored in the color reproduction region storage means.

For example, at least one method of the conversion means is conversion processing for performing compression on the color space so that an image outside the color reproduction region of the output apparatus can also have a gradation characteristic. At least one method of the conversion means is conversion processing for performing colorimetric color-matching between an image original and an output image within the color reproduction region of the output apparatus.

Furthermore, at least one method of the conversion means is conversion processing for performing enlargement on the color space, so that a color space region of an image original is widened within the color reproduction region of the output apparatus to obtain reproduction colors of an output image.

In the above arrangement, as an arrangement of a color reproduction processing system of a color image original, a color reproduction processing system for performing color reproduction color-matched with a color image original only within the color reproduction region of the image output apparatus is arranged in addition to a conventional color space compression mapping reproduction system. Thus, a processing system can be selected in accordance with the distribution of colors of an original on the color space coordinate system upon reading of the original, and optimal color reproduction can be realized according to the original.

A color image processing apparatus for converting input color image signals based on an additive color process into color image signals based on a corresponding subtractive color process, comprises first detection means for detecting the number of different colors using at least some of the input color image signals based on the additive color process, conversion means for converting the input color image signals based on the additive color process into the color image signals based on the corresponding subtractive color process by at least two methods, second detection means for detecting the numbers of different colors, in units of methods, of the color image signals based on the subtractive color process converted by the conversion means, difference calculation means for calculating differences between the numbers of colors detected by the second and first detection means, and selection means for selecting the color image signals converted by the method of the conversion means corresponding to the smallest difference calculated by the difference calculation means.

With the above arrangement, the number of colors of the input signals, and the number of post-processing colors are counted, and color conversion processing, which, for example, can minimize a decrease in the number of colors, is selected, so that optimal color conversion processing can be executed according to an input image, and the best output can be obtained.

Furthermore, the color image processing apparatus comprises color processing means for converting input color image signals into output color image signals, and outputting the output color image signals, storage means for dividing a color space in units of predetermined regions, and storing to which areas in the color space the input color image signals based on the additive color process belong, count means for counting the number of pixels belonging to each region of the input color image signals in units of regions on the basis of the storage contents of the storage means, and selection means for selecting conversion processing parameters of conversion means in accordance with the count results of the count means, wherein the conversion means converts the input color image signals into the output color image signals in accordance with the parameters selected by the selection means.

Alternatively, the color image processing apparatus comprises color processing means for converting input color image signals based on an additive color process into color image signals based on a corresponding subtractive color process, and outputting the converted color image signals, conversion means for converting the input color image signals based on the additive color process into a predetermined color space coordinate system, calculation means for calculating a distance between the coordinate position converted by the conversion means and a central coordinate position of a color processing region, which can be output by an output apparatus, and selection means for selecting conversion processing parameters of the color processing means in accordance with a calculation result of the calculation means, wherein the color processing means converts the input color image signals based on the additive color process into the color image signals based on the corresponding subtractive color process in accordance with the parameters selected by the selection means.

In the above arrangement, the color image processing apparatus has parameter groups of color reproduction processing of a color input image not only for one color space compression mapping reproduction system but also for a plurality of compression ratios, and selects a parameter group for an optimal compression ratio in accordance with the distribution of colors of input color image signals in the color space.

The color image processing apparatus has parameter groups of color reproduction processing of a color input image not only for one color space compression mapping reproduction system but also for a plurality of compression ratios, and selects a parameter group for an optimal compression ratio in accordance with the distance between the color space coordinate system of input color image signals and the barycentric coordinate system of the color reproduction region of an output apparatus, thereby realizing better color reproduction.

Furthermore, a color image processing apparatus for converting input color image signals based on an additive color process into color image signals based on a corresponding subtractive color process, and outputting the converted color signals to an output apparatus for processing the color signals, comprises conversion means for converting the input color image signals based on the additive color process into color image signals based on the corresponding subtractive color process by at least two processing methods, a look-up table for storing whether or not the input color image signals correspond to a combination of signals within a color reproduction range obtained by the output apparatus, determination means for determining, based on the look-up table, whether or not the input color signals fall within the color reproduction range of the output apparatus, and selection means for selecting a conversion method of the conversion means according to the determination result from the determination means. For example, the conversion means performs colorimetric color-matching between an input color image and an output converted image within the color reproduction range of the output apparatus.

The conversion means performs compression on the color space so as to provide a gradation characteristic also to colors outside the color reproduction region of the output apparatus.

In the above arrangement, direct conversion processing of input color image signals based on the additive color process, which are color-separated by, e.g., CCDs, is executed to determine whether or not the input signals are those allowing image formation, and optimal color reproduction can be realized according to the determination result.

For example, when it is determined that image formation is enabled, the input image signals are converted into color image signals based on the subtractive color process with reference to, e.g., a density conversion table. Contrary to this, when it is determined that image formation of the input color image signals based on the additive color process is difficult to perform, the input image signals are processed by, e.g., conventional masking processing. In this manner, a processing system can be selected in accordance with the distribution of colors of an original on the color space coordinate system, and optimal color reproduction can be realized according to originals.

Alternatively, the image processing apparatus comprises conversion means for respectively converting input color image signals into output color image signals by a plurality of kinds of methods, count means for checking if the color image signals converted by the conversion means fall within a reproduction range of an output apparatus, and counting the number of pixels falling outside the reproduction range, and selection means for selecting the conversion means, corresponding to the smallest count value of the count means, of the plurality of conversion means.

In the above arrangement, an optimal color image processing system can be selected in accordance with the distribution of colors of the input color image signals on a color space coordinate system, and optimal color reproduction can be realized in accordance with input color image signals.

Furthermore, a color image processing apparatus for processing input color image signals, and recording/outputting the processed color image signals to an image output apparatus as a corresponding color image, comprises at least two kinds of signal processing means for executing color conversion processing by different methods, so that the input color image signals can be output by the image output apparatus, storage means for storing chromaticity data within a color reproduction range, which can be recorded/output by the image output apparatus, comparison means for comparing the chromaticity data stored in the storage means with chromaticity data of the input color image signals, calculation means for obtaining a value corresponding to a smallest color difference between the two chromaticity data upon comparison by the comparison means in units of input color image signals, maximum value detection means for detecting a maximum value of the color differences obtained by the calculation means, and selection means for selecting an optimal one of the signal processing means according to the maximum value detected by the maximum value detection means.

In the above arrangement, the input color image signals are color-converted by the signal processing means selected by the selection means, and the converted signals are output to the image output apparatus as a corresponding recorded/output color image, so that optimal color conversion processing can be performed in accordance with an input image, and the best output can be obtained.

Moreover, a color image processing apparatus for converting input color image signals based on an additive color process into color image signals based on a corresponding subtractive color process, and outputting the converted color signals to an output apparatus for processing the color signals, comprises conversion means for converting the input color image signals based on the additive color process into color image signals based on the corresponding subtractive color process by at least two methods, and outputting the converted image signals to the output apparatus, color reproduction region storage means for storing a color reproduction region on a color space of the output apparatus, count means for checking if the input color image signals fall within the color reproduction region of the output apparatus stored in the color reproduction region storage means in units of pixels, and counting the number of pixels falling outside the color reproduction region, determination means for determining whether or not the count value of the count means is equal to or smaller than a predetermined threshold value, and selection means for selecting an optimal one of the at least two conversion means in accordance with the determination result of the determination means, wherein the output apparatus can perform color reproduction equivalent to the input color image signals.

The output apparatus permanently visually presents a color image by mixing colors using toners or inks. The color reproduction region storage means stores the color reproduction region in which the input color image signals are expressed by mixing colors using toners or inks of the output apparatus in a color space coordinate system. When the input color image signals exceed the conversion color reproduction region stored in the color reproduction region storage means, the selection means selects the conversion means which can perform optimal compression for the input color image signals.

In the above arrangement, as an arrangement of a color reproduction processing system of a color image original, a color reproduction processing system for performing color reproduction color-matched with a color image original only within the color reproduction region of the image output apparatus is arranged in addition to a conventional color space compression mapping reproduction system. Thus, a processing system can be selected in accordance with the distribution of colors of an original in the color space coordinate system upon reading of originals, and optimal color reproduction can be realized according to the original, Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment according to the present invention will be described below with reference to the accompanying drawings.

[First Embodiment]

Figure 1:
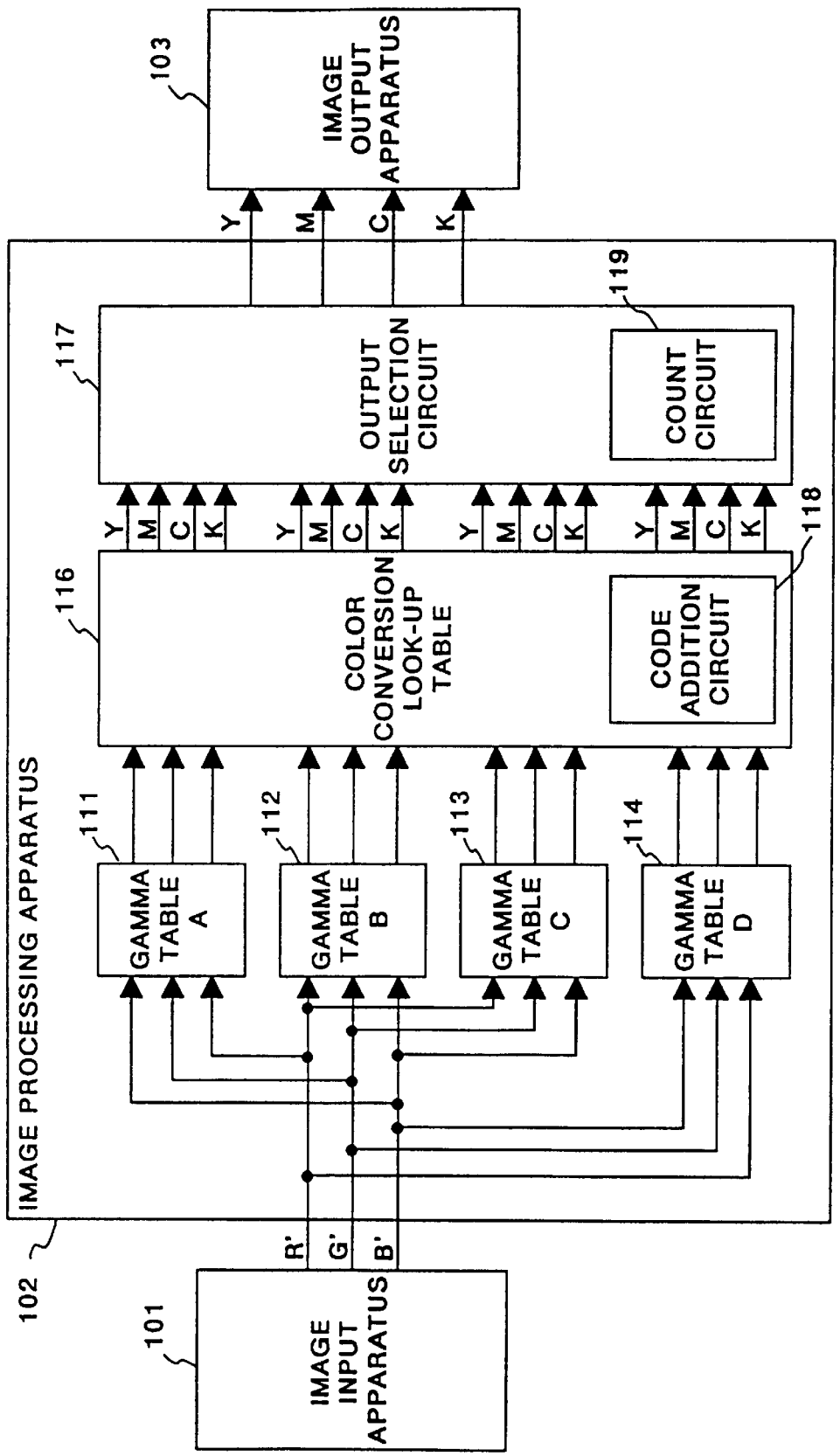
FIG. 1 is a block diagram showing an arrangement of the first embodiment according to the present invention.

FIG. 1 is a block diagram showing an arrangement of an embodiment obtained when the present invention is applied to a color image copying apparatus.

As shown in FIG. 1, the copying apparatus comprises three apparatuses, i.e., an image input apparatus 101 as an input unit of a color image, an image processing apparatus 102 for converting image input signals R (red), G (green) and B (blue) read by the image input apparatus 101 into image output signals, and an image output apparatus 103 for performing a permanent visual presentation corresponding to a plurality of colors of toners or inks upon reception of the image output signals Y (yellow), M (magenta), C (cyan) and K (black) converted by the image processing apparatus 102.

Image signals processed by the image processing apparatus 102 are not limited to those of a color image original or a printed matter read by an image reader comprising CCD sensor for R, G and B. For example, a CG (computer graphic) image output from a host computer, or an image picked up by an electronic still camera can be similarly processed.

The image processing apparatus 102 comprises four gamma tables A to D (111 to 114), a color conversion look-up table 116, and an output selection circuit 117. Note that the color conversion look-up table 116 incorporates a code addition circuit 118 for adding a discrimination code, and the output selection circuit 117 incorporates a count circuit 119 for counting the number of "1"s of the discrimination code added by the color conversion look-up table 116.

The image input apparatus 101 of this embodiment will be briefly described below with reference to FIG. 2 for cases wherein a color image is a printed original, and wherein a color image is a CG image.

A case will be exemplified below wherein the color image original is a printed matter.

Figure 2:
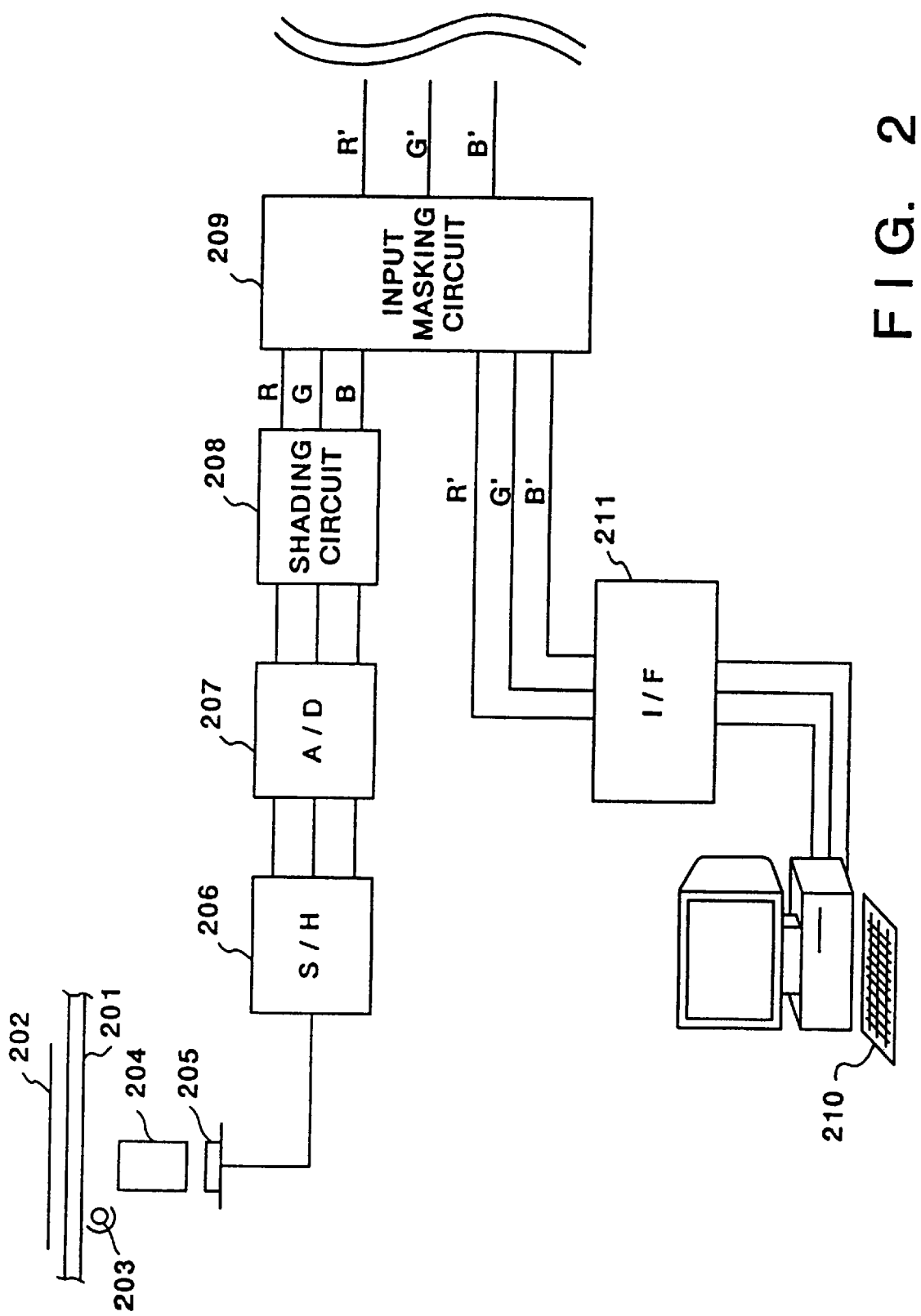
FIG. 2 is a block diagram showing the detailed arrangement of an image input apparatus of the first embodiment.

An original 202 placed on an original table glass 201 shown in FIG. 2 is illuminated with an original illumination halogen lamp 203, and is focused on a CCD line sensor 205 by a rod lens array 204.

Red (R), green (G), and blue (B) color separation filters are dot-sequentially coated on the CCD line sensor 205. Thus, the sensor 205 sequentially outputs R, G, and B color separation signals of an original image.

Reference numeral 206 denotes a sample & hold (S/H) circuit for sampling and holding outputs from the CCD line sensor 205 in units of pixels. The outputs from the S/H circuit 206 are converted into digital signals by an A/D converter 207.

Image data converted into the digital signals are input to a shading circuit 208 together with prestored (or previously obtained by reading white board before reading an image) white data (not shown). The output nonuniformity of the image data due to a variation in sensitivity among pixels corresponding to respective element of CCD is corrected, and the corrected image data are standardized to a predetermined number of bits.

An input masking circuit 209 calculates the R, G, and B output signals from the shading circuit 208 using a predetermined matrix, and outputs image signals R', G', and B' standardized according to the NTSC standards.

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}$$

The optimal solution of a matrix coefficient $a_{ij}$ is determined by, e.g., the method what is called least squares.

A case will be described below wherein a color original image is a CG color image.

R, G, and B video signals output from a computer 210 are input to the input masking circuit 209 via an interface 211. If these video signals comply with the NTSC standards, the matrix coefficients of the input masking circuit go through. That is, the matrix coefficient is given by:

$$a_{ij} = \begin{pmatrix} 1 & (i=j) \\ 0 & (i \neq j) \end{pmatrix}$$

The video signals are then output to the following image processing apparatus 102.

The image processing apparatus 102 for converting the digital R, G, and B input signals into a plurality of colors of toner or ink output signals will be described in detail below.

R, G, and B image signals input from the image input apparatus 101 to the image processing apparatus 102 are branched into n systems (n=4 in this embodiment), and are input to n gamma tables which respectively has different characteristic (e.g., the gamma tables A (111) to D (114)).

Signals gamma-converted by the corresponding gamma tables are sent to the color conversion look-up table 116, and are converted into Y, M, C, and K signals corresponding to the R, G, and B signals from the image input apparatus 101. The Y, M, C, and K signals are sent to the output selection circuit 117.

Note that the color conversion look-up table 116 stores only data in the color reproduction region of the image output apparatus 103 on the color space of the L*a*b* colorimetric system. When the input R, G, and B signals fall within the color reproduction region of the image output apparatus 103, the code addition circuit 118 adds a discrimination code "0" to the color-converted signals, and outputs these signals to the output selection circuit 117. However, when the input R, G, and B signals fall outside the color reproduction region of the image output apparatus 103, the circuit 118 adds a discrimination code "1" to the color-converted signals, and outputs these signals to the output selection circuit 117.

The count circuit 119 of the output selection circuit 117 counts the number of discrimination codes "1" to the color-converted signals of the input n kinds of Y, M, C, and K output signals in units of gamma tables, and outputs the signals from a gamma table corresponding to the smallest number of discrimination codes "1" to the image output apparatus 103.

The count circuit 119 need not always count the number of discrimination codes "1". For example, the circuit 119 may count the number of discrimination codes "0", and the output selection circuit may output signals from a gamma table corresponding to the largest number of discrimination codes "0" to the image output apparatus 103.

The image output apparatus 103 prints the image output signals (Y, M, C, and K) from the image processing apparatus 102 in correspondence with an output method such as a PWM method (multi-valued pixel output), a dither method, an error diffusion method (binary pixel output), or the like.

In the above embodiment, the color space distribution of a color image original is expressed using the L*a*b* uniform color coordinate system. However, the color space may be expressed using a color reproduction region of the image output apparatus, which region is defined by an Luv colorimetric system, an XYZ colorimetric system, or an RGB signal system, thus obtaining the same effect as described above.

It is effective to select an optimal gamma table in, e.g., a prescan mode.

More specifically, in a color copying machine, when an original is placed on an original table, and a copy start key is depressed, a prescan operation prior to an actual printing operation is normally executed so as to detect, e.g., an original size. In this case, the above-mentioned algorithm is executed, so that the optimal processing sequence (selection of gamma table) can be executed in the main scan mode.

Figure 21:
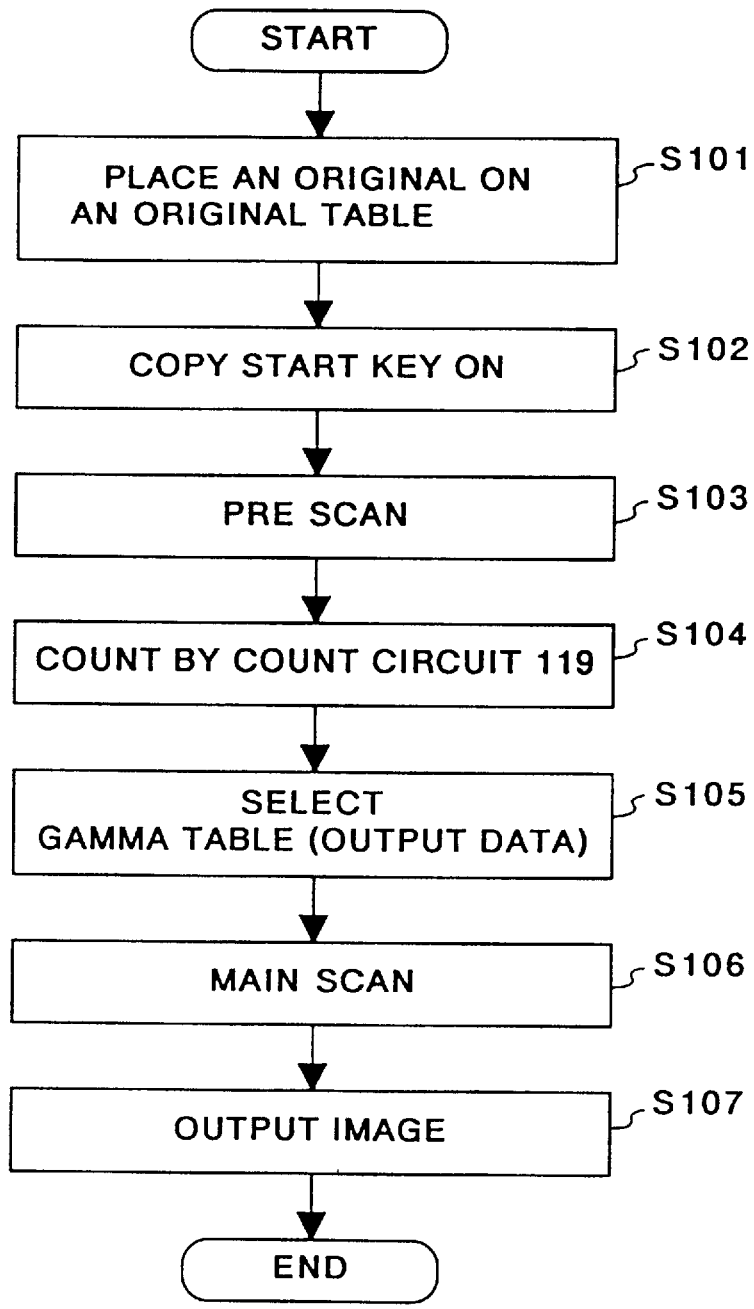
FIG. 21 is a chart showing processing of the present invention.

Foregoing processing is shown in FIG. 21.

An original is placed on an original table in step S101, and a copy start key is depressed at Step S102. In accordance with the ON of the copy start key, an image reader including a CCD sensor starts relative displacement, and performs prescan in step S103. At this time, above-described counting by the count circuit 119 is performed in step S104 as well as such process as detecting the original size and controlling exposure, and selection of the optimal gamma table from among gamma table 111 to 114 in step S105. Then, main scan is performed for forming an image in step S106, and the image is output by an image output apparatus 103 in step S107.

In the above described prescan, counting can be performed either at the time of going or returning of the relative displacement.

Also, the prescan can be performed repeatedly.

By performing the prescan as described above, image memory for storing one frame of image data can be saved.

As described above, according to the above-mentioned embodiment, color reproduction can be realized by performing optimal color conversion according to input color image signals.

More specifically, a plurality of kinds of gamma tables are prepared, and input signals are converted to fall within the color reproduction range of the image output apparatus in accordance with an original image. Thus, when all the input signals fall within the color reproduction range of the image output apparatus, unnecessary compression is inhibited; otherwise, optimal compression can be performed.

Especially in a grandchild copy, degradation of color reproducibility can be prevented as compared to a conventional apparatus.

[Second Embodiment]

The second embodiment according to the present invention will be described in detail below with reference to the accompanying drawings.

Figure 3:
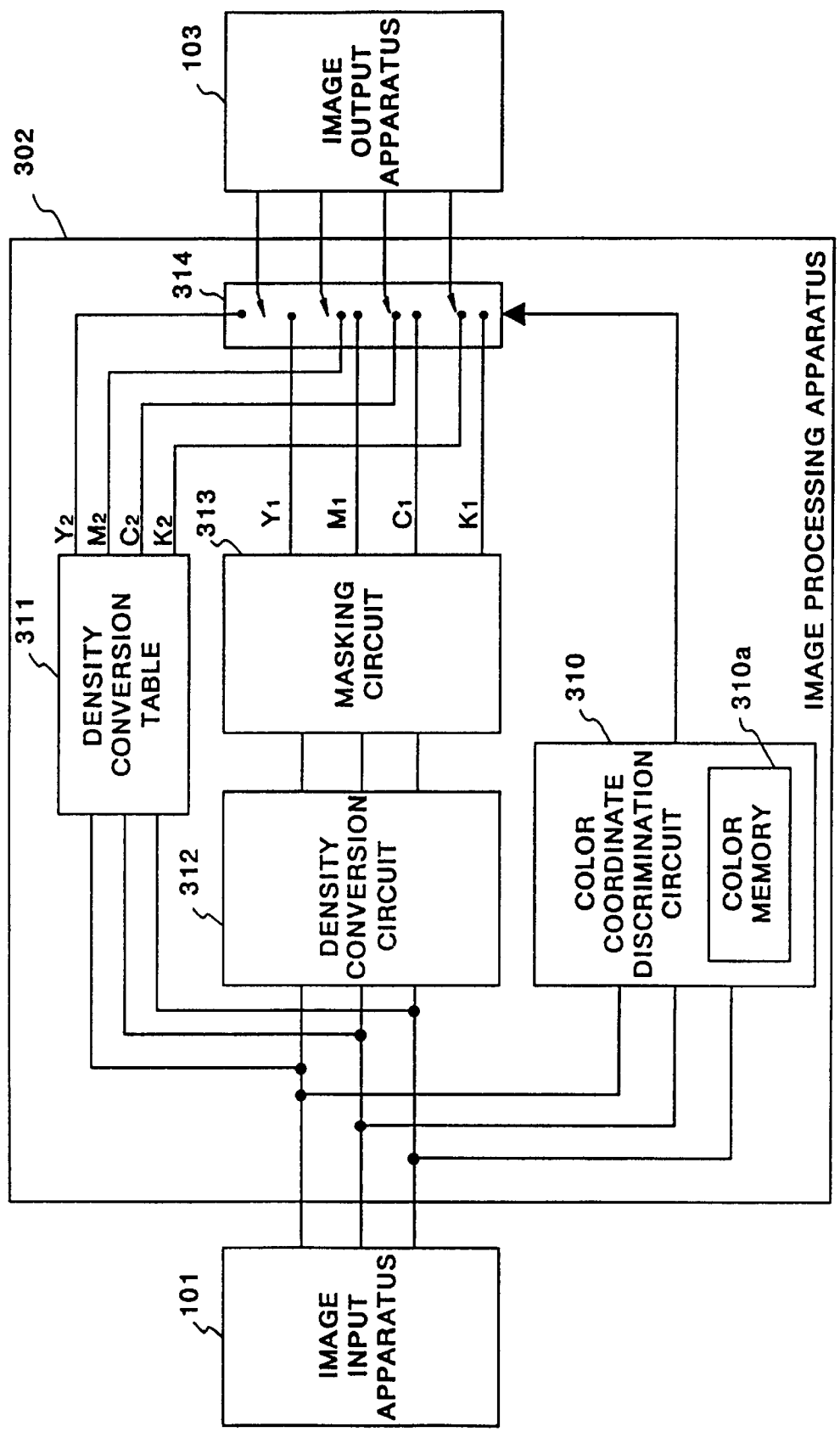
FIG. 3 is a block diagram showing an arrangement of the second embodiment according to the present invention.

FIG. 3 is a block diagram showing an arrangement of a copying apparatus according to the second embodiment. In the second embodiment, the arrangements of the image input apparatus 101 and the image output apparatus 103 are substantially the same as those in the first embodiment, and a detailed description thereof will be omitted.

The detailed arrangement of an image processing apparatus 302 comprising an arrangement different from that in the first embodiment will be described below.

The image processing apparatus 302 of the second embodiment comprises a color coordinate discrimination circuit 310, a density conversion table 311, a density conversion circuit 312, a masking circuit 313, and a switching circuit 314.

R, G, and B image signals input to the image processing apparatus 302 are branched into two systems, i.e., inputs to the color coordinate discrimination circuit 310, and inputs to the density conversion table 311 (to be described later) and the density conversion circuit 312.

The color coordinate discrimination circuit 310 discriminates whether the distribution of a color image original on the color space is included in the color reproduction region of the image output apparatus 103 or exceeds it by a method to be described below.

R, G, and B image signals input to the color coordinate discrimination circuit 310 are converted into tristimulus values X, Y, and Z of the XYZ colorimetric system.

When the R, G, and B signals comply with the NTSC scheme, a conversion formula is given by:

$$\begin{pmatrix} X \\ Y \\ Z \end{pmatrix} = \begin{pmatrix} 0.6067 & 0.1736 & 0.2001 \\ 0.2988 & 0.5178 & 0.1144 \\ 0.0 & 0.0661 & 1.1150 \end{pmatrix} \begin{pmatrix} R \\ G \\ B \end{pmatrix} \quad (1)$$

The image signals converted into the tristimulus values X, Y, and Z are then converted into L*, a*, and b* of the L*a*b* colorimetric system.

$$\begin{cases} L^* = 116(Y/Y_0) - 16 \\ a^* = 504.3[(X/X_0)^{1/3} - (Y/Y_0)^{1/3}] \\ b^* = 201.7[(Y/Y_0)^{1/3} - (Z/Z_0)^{1/3}] \end{cases} \quad (2)$$

$(X_0, Y_0, Z_0 = \text{constants})$

Figure 4:
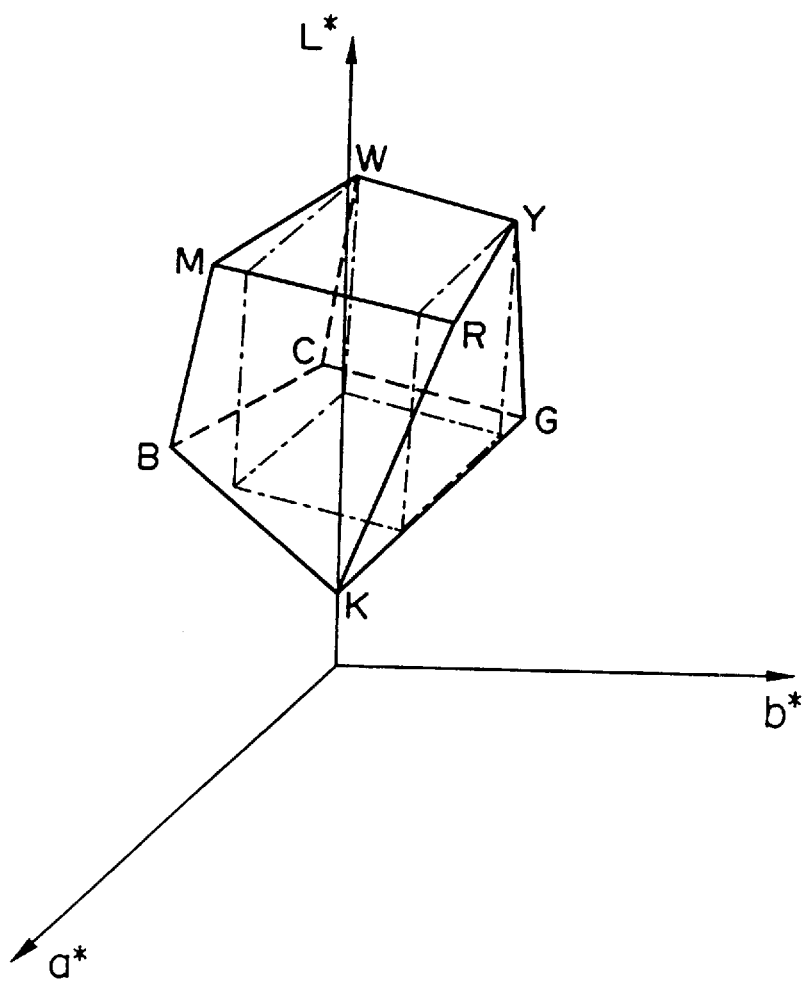
FIG. 4 is a chart showing a color reproduction region of an image output apparatus in an L*a*b* uniform color space.

FIG. 4 shows a state on the L*a*b* colorimetric system. A hexahedron indicated by solid lines in FIG. 4 represents the color reproduction region of the image output apparatus 103 described above. When image signals are present in this hexahedron, the image output apparatus can reproduce colors.

Whether or not the image signals converted into the L*a*b* coordinates by equation (2) fall within the color reproduction region is determined in units of pixels by the following method.

The color coordinate discrimination circuit 310 comprises a color memory 310a comprising ROM, RAM and so on for storing color information of a regular hexahedron (a solid indicated by alternate long and short dashed lines in FIG. 4) inscribing the hexahedron of the reproduction region, and data achromatic color data) near a straight line connecting K and W in FIG. 4.

The data in the color memory 310a are looked up in units of pixels of the image signals converted into the L*a*b* coordinates by equation (2), and the number of pixels falling outside the regular hexahedron is counted. Whether or not the count value exceeds a given threshold value is determined to check whether or not colors of an original fall within the color reproduction region of the image output apparatus 103, thereby outputting a 1-bit discrimination signal.

For example, when a color image original is an output image of the copying apparatus of this embodiment (to be referred to as a "generation copy" or a "grandchild copy" hereinafter), all the image data are present within the color reproduction region, and the color coordinate discrimination circuit 310 always discriminates that all the pixels are present in the reproduction region.

Of the R, G, and B image signals input to the image processing apparatus 302, the other branched system is further branched into two systems. One system is subjected to the same processing as that executed by the log conversion circuit 402 and the masking circuit 403 in the prior art shown in FIG. 19 by the density conversion circuit 312 and the masking circuit 313.

More specifically, the color space of a color image original is set to be larger than the color reproduction region of the image output apparatus 103, and is reproduced while being compressed, thereby executing processing for outputting an image having a gradation characteristic for color coordinates falling outside the color reproduction region.

Meanwhile, the image signals are also input to the density conversion table 311 simultaneously with the above-mentioned color processing. The density conversion table 311 is a conversion table for receiving the R, G, and B image signals, and outputting Y, M, C, and K output signals.

A method of creating the density conversion table 311 will be briefly described below.

It is assumed to be already known that reproduction colors obtained when a given set (y, m, c, k) of Y, M, C, and K output signals are printed by the image output apparatus 103 are (l*,a*,b*) on the L*a*b* coordinate system.

On the other hand, the L*, a*, and b* coordinates of R, G, and B image read signals can be calculated by equations (1) and (2). Therefore, the R, G, and B image read signals can colorimetrically correspond to Y, M, C, and K output signals via the L*a*b* coordinate system.

In general, in an image recording apparatus for printing an image using four colors Y, M, C, and K, a reproduction color printed based on a given set of output signals ($Y_1$, $M_1$, $C_1$, $K_1$) is often colorimetrically color-matched with that printed based on another set of output signals ($Y_2$, $M_2$, $C_2$, $K_2$).

This is because black defined by mixing three colors Y, M, and C is color-matched with black defined by K. This means that different sets of Y, M, C, and K output values are present in correspondence with a set of mixing color coordinates (l*,a*,b*).

In this table, of a plurality of sets of Y, M, C, and K output values, which sets are color-matched with each other, a set having the largest K signal is determined as an output value. This is to enhance the effect of UCR (undercolor removal) processing.

The conversion table created as described above allows color reproduction color-matched with a color image original within the color reproduction region.

Of the image output signals ($Y_1$, $M_1$, $C_1$, $K_1$) and ($Y_2$, $M_2$, $C_2$, $K_2$) converted in the respective systems, when it is determined based on the discrimination result of the color coordinate discrimination circuit 310 that the color image original exceeds the color reproduction region, the switching circuit 314 selects the output signals ($Y_1$, $M_1$, $C_1$, $K_1$) obtained by compressed color processing. On the other hand, when it is determined that the color image original falls within the color reproduction region, the switching circuit 314 selects the output signals ($Y_2$, $M_2$, $C_2$, $K_2$) obtained by the color-matched color reproduction processing. In either case, the selected output signals are output to the image output apparatus 103.

In the second embodiment described above, the color space distribution of a color image original is discriminated by the color coordinate discrimination circuit 310. In this case, data stored in the color memory 310a define a maximum regular hexahedron in the color reproduction region of the image output apparatus for the purpose of decreasing the number of bits. However, the present invention is not limited to the above embodiment. For example, the data may include all the signal values in the color reproduction region, thus allowing more precise discrimination.

In the second embodiment, the color space of the color coordinate discrimination circuit 310 is expressed using the L*a*b* uniform color coordinate system. However, the color space of the color coordinate discrimination circuit 310 may be expressed by a color reproduction region of an image output apparatus, which region is defined by an Luv colorimetric system, an XYZ colorimetric system, or an RGB signal system, thus obtaining the same effect as described above.

It is effective to perform the above-mentioned discrimination in the prescan mode like in the first embodiment.

In the above description, when the color space distribution of a color image original exceeds the color reproduction region, calculation processing by the density conversion circuit 312 and the masking circuit 313 is executed. Alternatively, a correspondence between input and output signals of this processing system may be calculated beforehand, and may be written in a look-up table (ROM, RAM and so on) so as to execute color reproduction processing of a compressed space.

Furthermore, the correspondence between input and output signals to be written in a look-up table may be a relation other than by calculation of approximate equation.

As described above, according to the second embodiment, the color space distribution of a color image original is detected to check if the color space distribution is present within the color reproduction region. One of outputs from different color processing systems is then selected according to the original. In this manner, color reproduction that can maintain a gradation characteristic of a color image original exceeding the color reproduction region of the image output apparatus, or color reproduction faithful to a color image original within the color reproduction region, can be performed, and an optimal output image can be obtained.

An image free from a change in reproduction color can be obtained for repetitive grandchild copies.

As described above, according to the present embodiment, as the arrangement of the color reproduction processing system of a color image original, a color reproduction processing system for performing color reproduction color-matched with an input color image only within the color reproduction region of the image output apparatus is arranged in addition to the conventional color space compression mapping reproduction system. Therefore, a processing system can be selected in accordance with the spread of colors of input color image signals on the color space coordinate system, and optimal color reproduction can be realized in accordance with an input color image.

More specifically, as the arrangement of the color reproduction processing system of a color image original, a color reproduction processing system for performing color reproduction color-matched with an input color image only within the color reproduction region of the image output apparatus is arranged in addition to the conventional color space compression mapping reproduction system. Therefore, a processing system can be selected in accordance with the spread of colors of input color image signals on the color space coordinate system, and optimal color reproduction can be realized in accordance with an input color image.

[Third Embodiment]

The third embodiment according to the present invention will be described in detail below with reference to the accompanying drawings.

The hardware arrangement of the third embodiment is the same as that of the second embodiment described above. A difference from the second embodiment is that the color coordinate discrimination circuit 310 does not incorporate the color memory 310a for determining based on a look-up result of the storage data in the color memory 310a whether or not colors of an original fall within the color reproduction region of the image output apparatus 103, but performs discrimination as follows.

Discrimination processing for determining whether or not colors of an original fall within the color reproduction region according to the third embodiment will be explained below.

In the third embodiment, whether or not image signals converted into the L*a*b* coordinates by equation (2) fall within the color reproduction region is checked in units of pixels by the following method.

An equation for each plane of the hexahedron as the color reproduction region of the image output apparatus 103 in the above-mentioned L*a*b* colorimetric system shown in FIG. 4 is given by:

$$kL^* + la^* + mb^* + n = 0$$

$$(k, l, m, n = \text{constants})$$

Therefore, in the hexahedron, image signals (L*,a*,b*) must satisfy the following relation for each plane:

$$k_i L^* + l_i a^* + m_i b^* + n_i \geq 0$$

$$(i = 1 \text{ to } 6)$$

In this manner, the above-mentioned discrimination is performed in units of pixels for the entire surface or a portion of a color image original, and the number of pixels present within the color reproduction region is accumulated.

Upon completion of the above-mentioned processing for a predetermined region, the accumulated value is compared with a predetermined threshold value. For example, when 95% or more of an original image are present in the color reproduction region, it is determined that the color space distribution of the color image original is present within the color reproduction region, and a 1-bit discrimination signal is output.

In the third embodiment described above, the color space distribution of a color image original is automatically discriminated by the color coordinate discrimination circuit 310. For example, when a user can easily determine the color space distribution of an original image like in a case wherein an output image from the apparatus of this embodiment is used as an original (grandchild copy), the output from the switching circuit 314 may be switched in accordance with an operation input instruction from an operation unit (not shown) of the apparatus of this embodiment, thus obtaining the same effect as described above.

In the third embodiment, the color space of the color coordinate discrimination circuit 310 is expressed using the L*a*b* uniform color coordinate system. However, the color space of the color coordinate discrimination circuit 310 may be expressed by a color reproduction region of an image output apparatus, which region is defined by an Luv colorimetric system, an XYZ colorimetric system, or an RGB signal system, thus obtaining the same effect as described above.

In the second and third embodiments described above, whether or not colors of an original are present within the color reproduction region is discriminated by the color coordinate discrimination circuit 310. Alternatively, the color space may be divided into small color space blocks, and to which small color space blocks an original image belongs may be accumulated in units of blocks. Then, the number of blocks where the colors of an original image are present, and coordinates of the blocks on the color space may be discriminated to discriminate the color space distribution of the original image.

Two color reproduction processing systems, i.e., a compression reproduction system and a color-matching reproduction system on the color space are presented. In addition, a color processing system for performing enlargement on the color space may improve a gradation characteristic.

This example will be briefly described below. Assume a map as a color image original to be color-copied. In most maps, the depths of seas are expressed by changing the density from white to blue or cyan. The heights of mountains are expressed by changing the density from yellow to brown.

When original image colors are distributed on small regions in the color space in this manner, optimal color reproduction on visual recognition can be realized by performing enlarged reproduction on the color space (e.g., increasing the saturation on the color space).

As described above, according to the present invention, as the arrangement of the color reproduction processing system of a color image original, a color reproduction processing system for performing color reproduction color-matched with an input color image only within the color reproduction region of the image output apparatus is arranged in addition to the conventional color space compression mapping reproduction system. Therefore, a processing system can be selected in accordance with the spread of colors of input color image signals on the color space coordinate system, and optimal color reproduction can be realized in accordance with an input color image.

In this case, whether or not input color image signals fall within the color reproduction region of the image output apparatus can be easily discriminated by only simple calculation processing without arranging, e.g., a color memory.

Furthermore, for a color image original distributed on small regions in the color reproduction region, a gradation characteristic can be provided to an original, and an optimal output image in terms of good visual recognition can be obtained.

[Fourth Embodiment]

In the above description, when the color space distribution of a color image original is included in the color reproduction region, signal conversion based on table conversion using the density conversion table 311 is executed. Alternatively, color reproduction by a nonlinear masking calculation including higher-order terms than one-order may be performed without using a table.

In masking used in this case, for example, coefficients $a_{i,j}$ are determined by, e.g., the method of least squares by sampling representative colors in the color reproduction region using the following matrix:

$$\begin{pmatrix} Y \\ M \\ C \\ K \end{pmatrix} = \begin{pmatrix} a_{11} & a_{12} & a_{13} & a_{14} & a_{15} & a_{16} & \cdots \\ a_{21} & a_{22} & a_{23} & a_{24} & a_{25} & a_{26} & \cdots \\ a_{31} & a_{32} & a_{33} & a_{34} & a_{35} & a_{36} & \cdots \\ a_{41} & a_{42} & a_{43} & a_{44} & a_{45} & a_{46} & \cdots \end{pmatrix} \begin{pmatrix} Y \\ M \\ C \\ K \\ YM \\ YC \\ MC \\ \vdots \end{pmatrix}$$

In this manner, density conversion can be performed without arranging tables or the like.

In each of the above-mentioned embodiments, input signals to the density conversion tables are R, G, and B signals complying with the NTSC scheme. Alternatively, L*, a*, and b* signals generated by the color space coordinate discrimination circuit 310 may be used as input image signals to the density conversion table. In this case, image input signals input to the image input apparatus 101 through, e.g., an I/F are not limited to R, G, and B color-separation signals, and if physical amounts L*, a*, and b* on the L*a*b* uniform color coordinate system are colorimetrically known, color reproduction is enabled.

As described above, according to the above embodiment, the color space distribution of a color image original is detected to check if the color space distribution is present in the color reproduction range, and one of outputs from different color processing systems is selected according to an original. Thus, color reproduction that can maintain a gradation characteristic of a color image original exceeding the color reproduction region of the image output apparatus, or color reproduction faithful to a color image original within the color reproduction region, can be performed, and an optimal output image can be obtained.

An image free from a change in reproduction color can be obtained for grandchild copies.

[Fifth Embodiment]

The fifth embodiment according to the present invention will be described in detail below with reference to the accompanying drawings.

Figure 5:
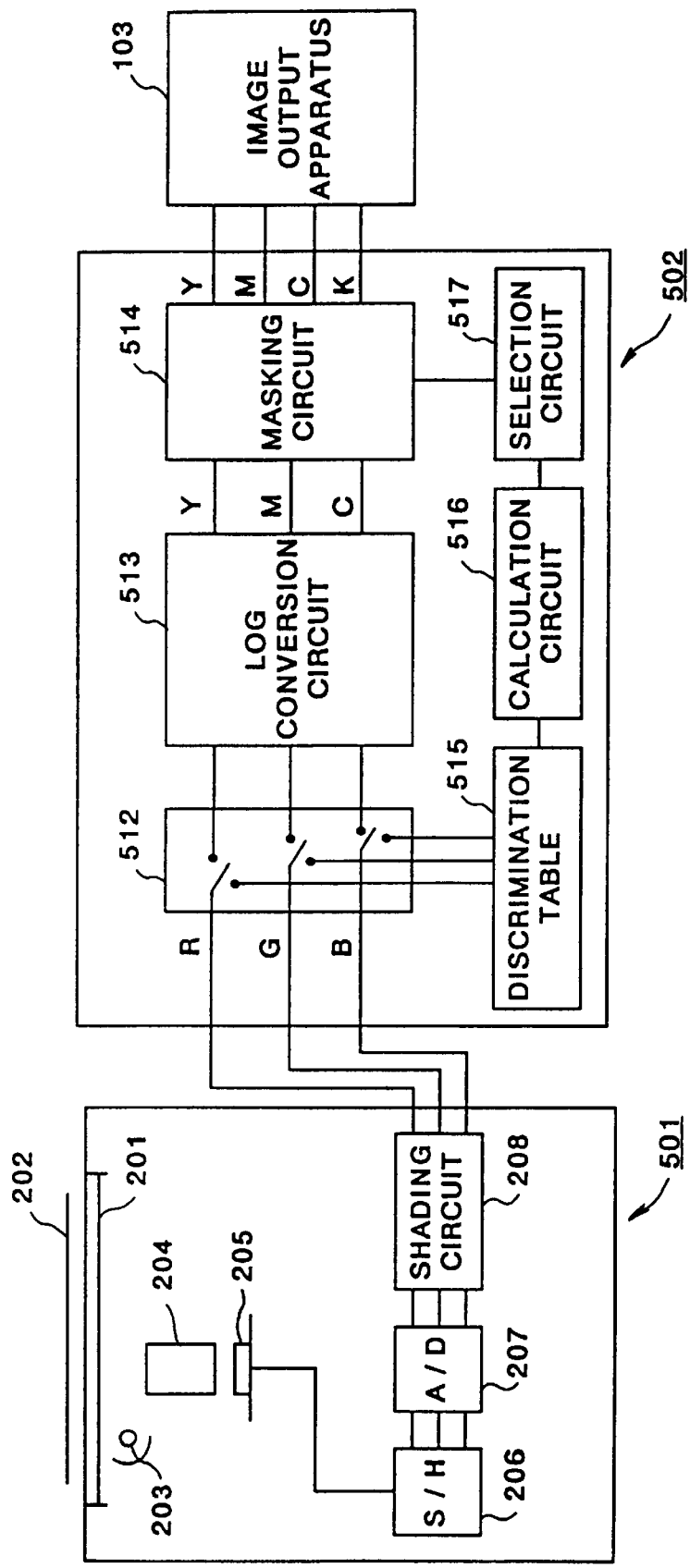
FIG. 5 is a block diagram showing an arrangement of the fifth embodiment according to the present invention.

FIG. 5 is a block diagram showing an arrangement of a copying apparatus according to the fifth embodiment of the present invention.

The same reference numerals in FIG. 5 denote the same parts as in FIGS. 1 and 2, and a detailed description thereof will be omitted.

As shown in FIG. 5, the copying apparatus of this embodiment comprises three apparatuses, i.e., an image input apparatus 501 as a color image input unit, an image processing apparatus 502 for converting image input signals read by the image input apparatus 501 into image output signals, and an image output apparatus 503 for performing a permanent visual presentation corresponding to a plurality of colors of toners or inks upon reception of the image output signals converted by the image processing apparatus 502.

The image processing apparatus 502 comprises a switching circuit 512, a log conversion circuit 513, a masking circuit 514, a discrimination table 515, a calculation circuit 516, and a selection circuit 517.

The image input apparatus 501 comprises only an original reading unit as compared to the first embodiment, and control for reading a color image original is the same as that in the first embodiment shown in FIG. 2.

The image processing apparatus 502 for converting digital R, G, and B input signals into a plurality of colors of ink or toner output signals according to this embodiment will be described in detail below.

In the apparatus of this embodiment, prior to a copying operation of an original, the color space region of an original is discriminated by a prescan operation of the image input apparatus 501. For this purpose, R, G, and B image signals input to the image processing apparatus 502 are selectively output to the discrimination table 515 side by the switching circuit 512.

The discrimination table 515 discriminates using the above-mentioned conversion equations (1) and (2) like in the color coordinate discrimination circuit 310 of the above embodiments whether or not the distribution of a color image original on the color space is included in the color reproduction region of the image output apparatus 103.

Figure 6:
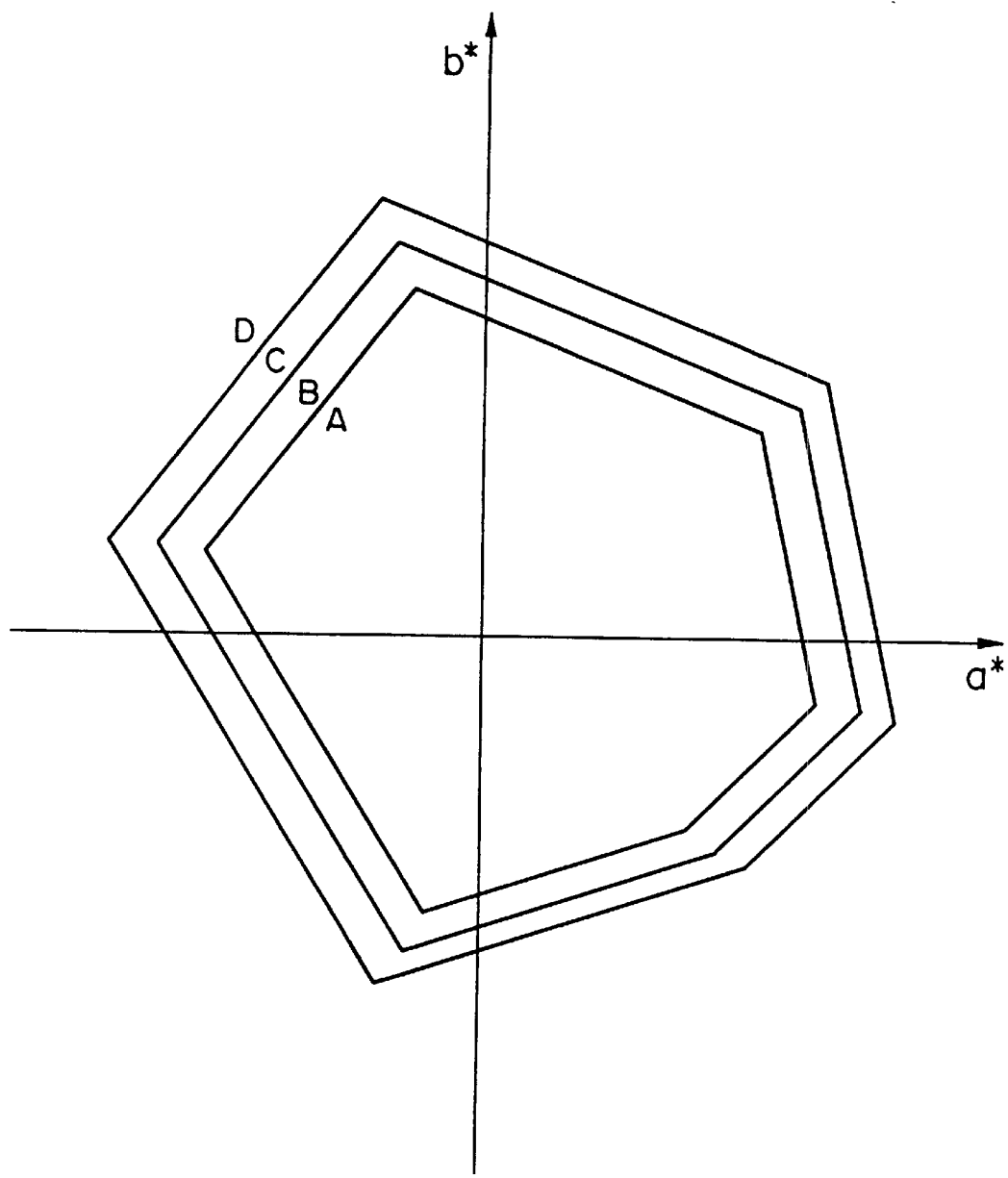
FIG. 6 is a chart showing a determination region in a determination table on an a*–b* plane in the fifth embodiment.

FIG. 6 shows a discrimination region of the discrimination table 515 on an a*–b* plane in the L*a*b* colorimetric system. A region A in FIG. 6 represents the color reproduction region of the image output apparatus 103.

The color space is divided into a region B obtained by slightly widening the color reproduction region A, a region C obtained by slightly widening the region B, and the remaining region D.

Figure 7:
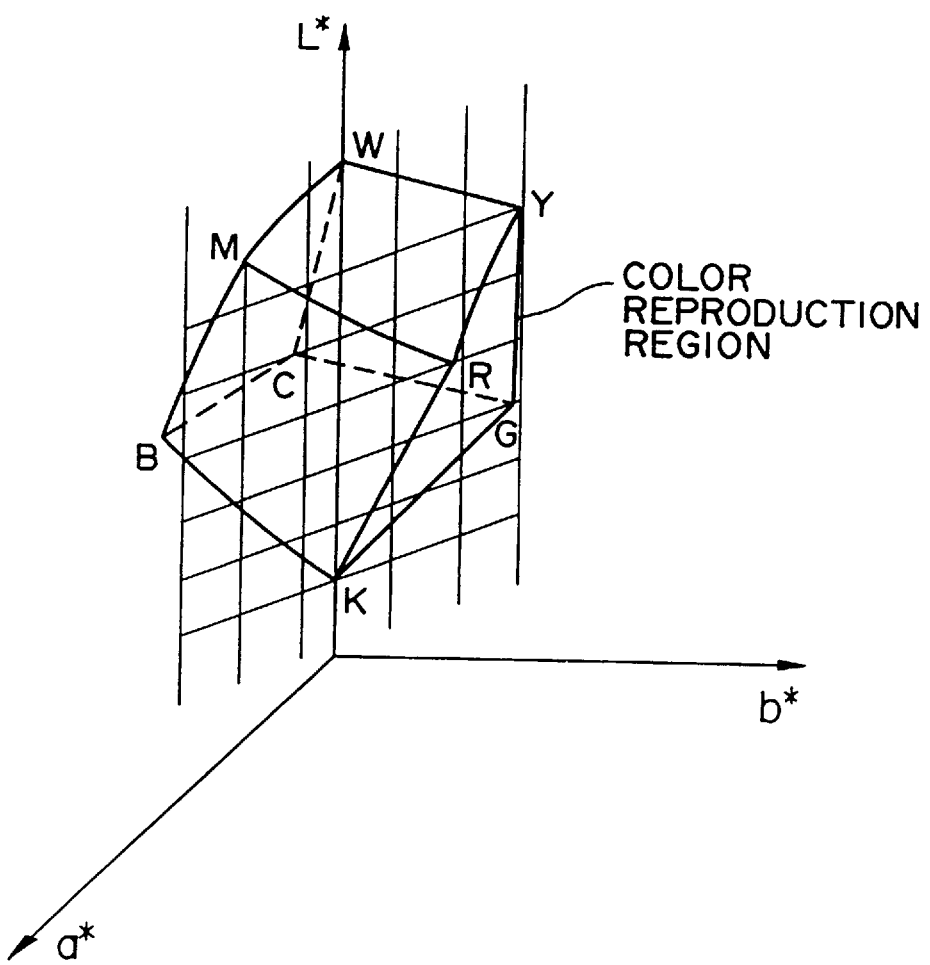
FIG. 7 is a chart showing a color reproduction region of an image output apparatus in an L*a*b* uniform color space in the fifth embodiment.

FIG. 7 shows a state of the color space of the color reproduction region A of the image output apparatus 103 on the L*a*b* colorimetric system.

The discrimination table 515 outputs a 2-bit signal indicating one of the regions A to D in accordance with upper 5 bits of each of the R, G, and B signals The discrimination signal output from the discrimination table 515 is input to the calculation circuit 516. The calculation circuit 516 calculates the sum of pixels corresponding to the regions A to D. The selection circuit 117 sets optimal masking coefficients on the basis of the calculation result. For example, selection criterions are set as follows.

- parameters as in conventional compression color reproduction
  if $D > 5\%$
- parameters for compressing the frame of $C$ to $A$
  if $D \leq 5\%$, and $D + C > 5\%$
- parameters for compressing the frame of $B$ to $A$
  if $D + C \leq 5\%$, and $D + C + B > 5\%$
- in other cases, color reproduction parameters for color-matching with an original in only the region $A$ The optimal parameters are set in this manner.

Upon completion of setting of the parameters, the main scan operation of the image input apparatus 501 is started, and color conversion processing is executed based on the parameters selected in the prescan operation, thereby copying an image.

When an image is to be copied, R, G, and B image signals input to the image processing apparatus 502 are input to the log conversion circuit 513 side by the switching circuit 512, and are converted into corresponding C, M, and Y image signals by the log conversion circuit 513.

The C, M, and Y image signals are then input to the masking circuit 514, and are subjected to the masking calculation using the optimal coefficients based on the discrimination result.

In this manner, both color reproduction and gradation expression can be satisfactorily maintained.

The image output apparatus 103 prints the image output signals (Y, M, C, K) in correspondence with an output method such as a PMM method, a dither method, an error diffusion method, or the like.

As described above, according to this embodiment, the color space distribution of a color image original is detected, and processing is executed using parameters which can minimize compression in the color space, so that color reproduction faithful to colors of an original, and free from degradation of a gradation characteristic can be performed.

An image free from a change in reproduction color can be obtained for repetitive grandchild copies.

In the fifth embodiment described above, the color space distribution of a color original is automatically discriminated by the discrimination table 515. For example, when a user can easily determine the color space distribution of an original image like in a case wherein an output image of the copying apparatus of this embodiment is used as an original (grandchild copy), the selection circuit 517 may be switched in response to an instruction input from an operation unit of the copying apparatus of this embodiment, thus obtaining the same effect as described above.

[Sixth Embodiment]

In the above description, the masking coefficients are changed in accordance with the color space distribution of an original. In place of the color space distribution of an original, image signals obtained by reading an original are converted into a predetermined color space coordinate system, and masking coefficients may be changed in accordance with the distance between the converted coordinate position and the central coordinate position of the color reproduction region, which can be output by the image output apparatus, thus obtaining the same effect as described above.

Figure 8:
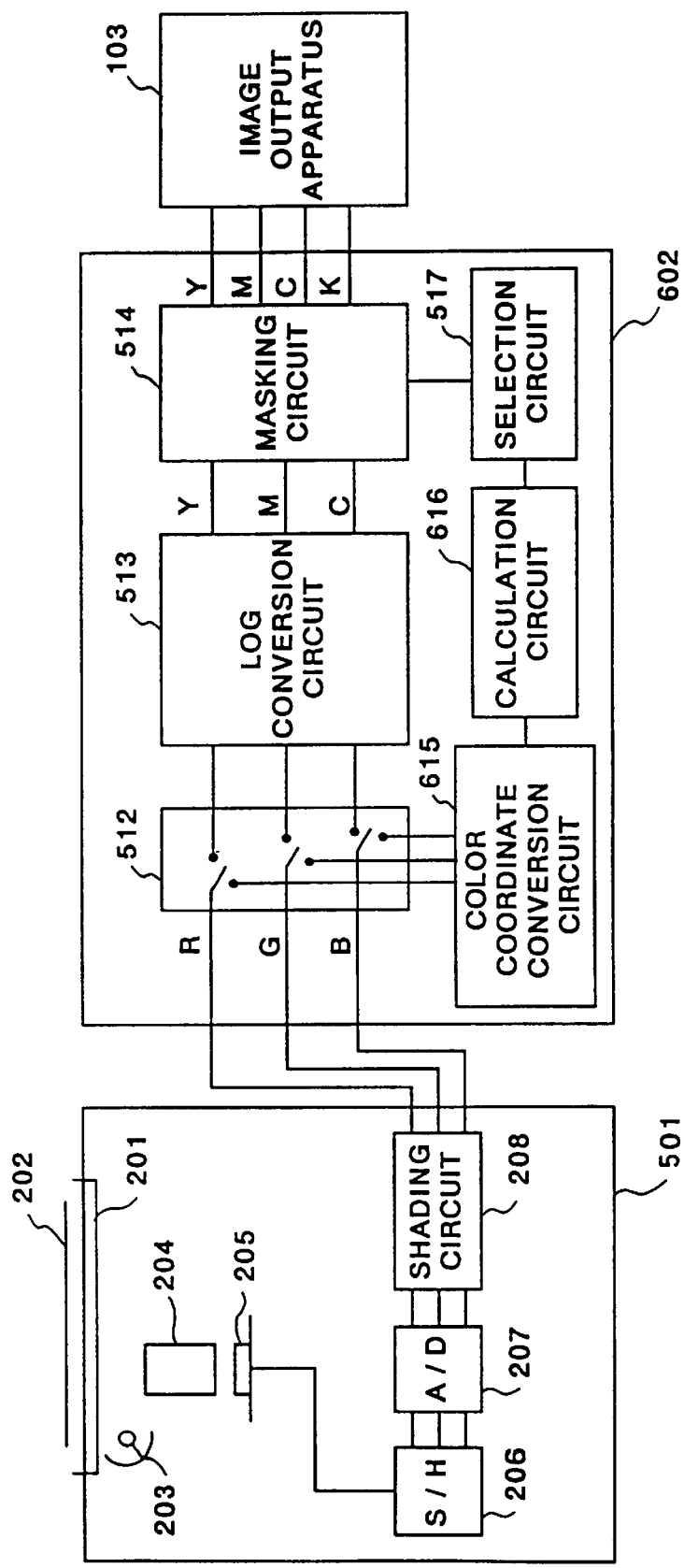
FIG. 8 is a block diagram showing an arrangement of the sixth embodiment according to the present invention.

FIG. 8 shows the arrangement of the sixth embodiment according to the present invention. The same reference numerals in FIG. 8 denote the same parts as in the fifth embodiment shown in FIG. 5, and a detailed description thereof will be omitted. In FIG. 8, an image processing apparatus 602 is different from that in the fifth embodiment shown in FIG. 5.

In FIG. 8, a color coordinate conversion circuit 615 for converting image signals obtained by reading an original into a predetermined color space coordinate system is arranged in place of the discrimination table 515 shown in FIG. 5. In addition, a calculation circuit 616 for calculating the distance between the converted coordinate position of image signals converted into the color space coordinate system by the color coordinate conversion circuit 615, and the central coordinate position of the color reproduction region, which can be output by an image output apparatus 103, is arranged.

R, G, and B image signals input to the image processing apparatus 602 by a prescan operation of an image input apparatus 501 are selectively output to the color coordinate conversion circuit 615 side by a switching circuit 512. This is to convert image signals obtained by reading an original into the color space coordinate system, and to change masking coefficients in accordance with the distance between the converted coordinate position and the central coordinate position of the color reproduction region, which can be output by the image output apparatus 103.

Like in the color coordinate discrimination circuit 310 described above, the color coordinate conversion circuit 615 discriminates, by a method to be described below, whether the distribution of a color image original on the color space is included in or exceeds the color reproduction region of the image output apparatus 103.

R, G, and B image signals input to the color coordinate conversion circuit 615 are converted into tristimulus values X, Y, and Z of the XYZ colorimetric system. When the R, G, and B signals comply with the NTSC scheme, the conversion equation is expressed by equation (1) of the first embodiment.

The image signals converted into the tristimulus values X, Y, and Z by equation (1) are converted into L*, a*, and b* signals of the L*a*b* colorimetric system by the above-mentioned equation (2).

The image signals converted into the L*, a*, and b* coordinates by equation (2) are input to the calculation circuit 616 so as to obtain the distance from the barycenter ($L_0$, $a_0$, $b_0$) of the color reproduction region of the image output apparatus 103.

The distance r is obtained by the following equation (3):

$$r = (L^* - L_0)^2 + (a^* - a_0)^2 + (b^* - b_0)^2 \quad (3)$$

Figure 9:
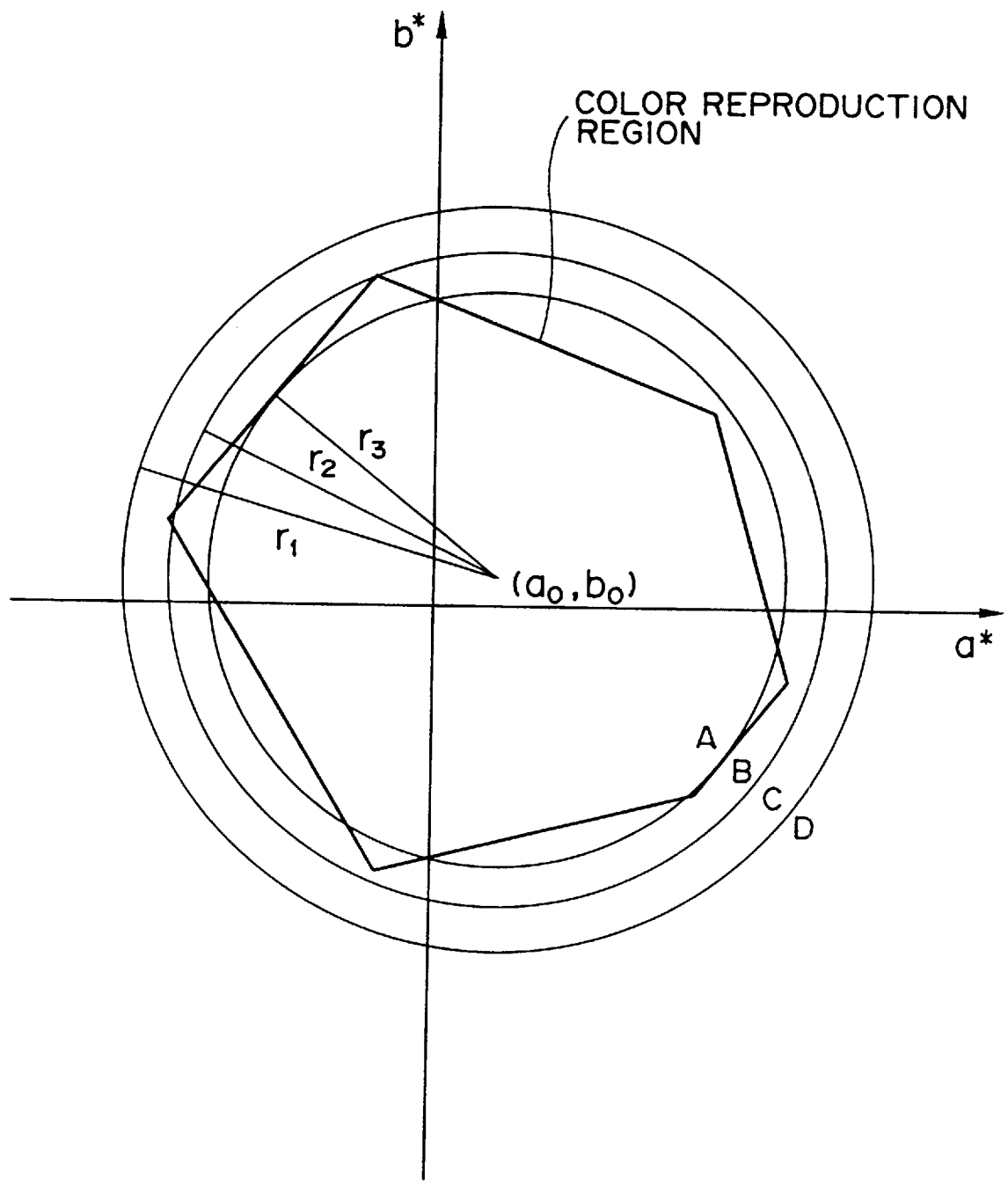
FIG. 9 is a chart showing a color reproduction region of an image output apparatus on an a*–b* plane, and the distances from the barycenter of the color reproduction region in the sixth embodiment.

FIG. 9 shows a state on the L*a*b* colorimetric system. A hexagon indicated by solid lines in FIG. 9 represents the color reproduction region of the image output apparatus 103 described above. When image signals are present in this hexagon, the image output apparatus can reproduce colors.

To which regions A to D shown in FIG. 9 the input image signals belong is determined in accordance with the obtained distance r, and the number of pixels belonging to the regions A to D is counted in units of regions.

A selection circuit 517 selects optimal masking coefficients in accordance with the count result, and sets the selected coefficients in a masking circuit 514.

The selection criterions are the same as those used when the calculation circuit 516 in the fifth embodiment described above calculates the sum of pixels belonging to the regions A to D, and the selection circuit 517 sets optimal masking coefficients based on the calculation result.

Upon completion of setting of the parameters, the main scan operation of the image input apparatus 501 is started, and color conversion processing is executed based on the parameters selected in the prescan operation, thereby copying an image.

As described above, according to this embodiment, the color space distribution of a color image original is detected, and processing is executed using parameters which can minimize compression in the color space, so that color reproduction faithful to colors of an original, and free from degradation of a gradation characteristic can be performed.

An image free from a change in reproduction color can be obtained for repetitive grandchild copies.

In the fifth and sixth embodiments described above, the masking coefficients are changed in accordance with the color distribution of an original. A plurality of sets of R→C, G→M, and B→Y conversion tables may be prepared, and may be selected in accordance with the color distribution, thus allowing gradation expression faithful to an original.

As described above, according to the present invention, a processing system can be selected in accordance with the spread of colors of input color image signals on the color space coordinate system, and optimal color reproduction can be realized according to an input color image.

In addition, an image free from a change in reproduction color can be obtained for repetitive grandchild copies.

[Seventh Embodiment]

The seventh embodiment according to the present invention will be described in detail below with reference to the accompanying drawings.

Figure 10:
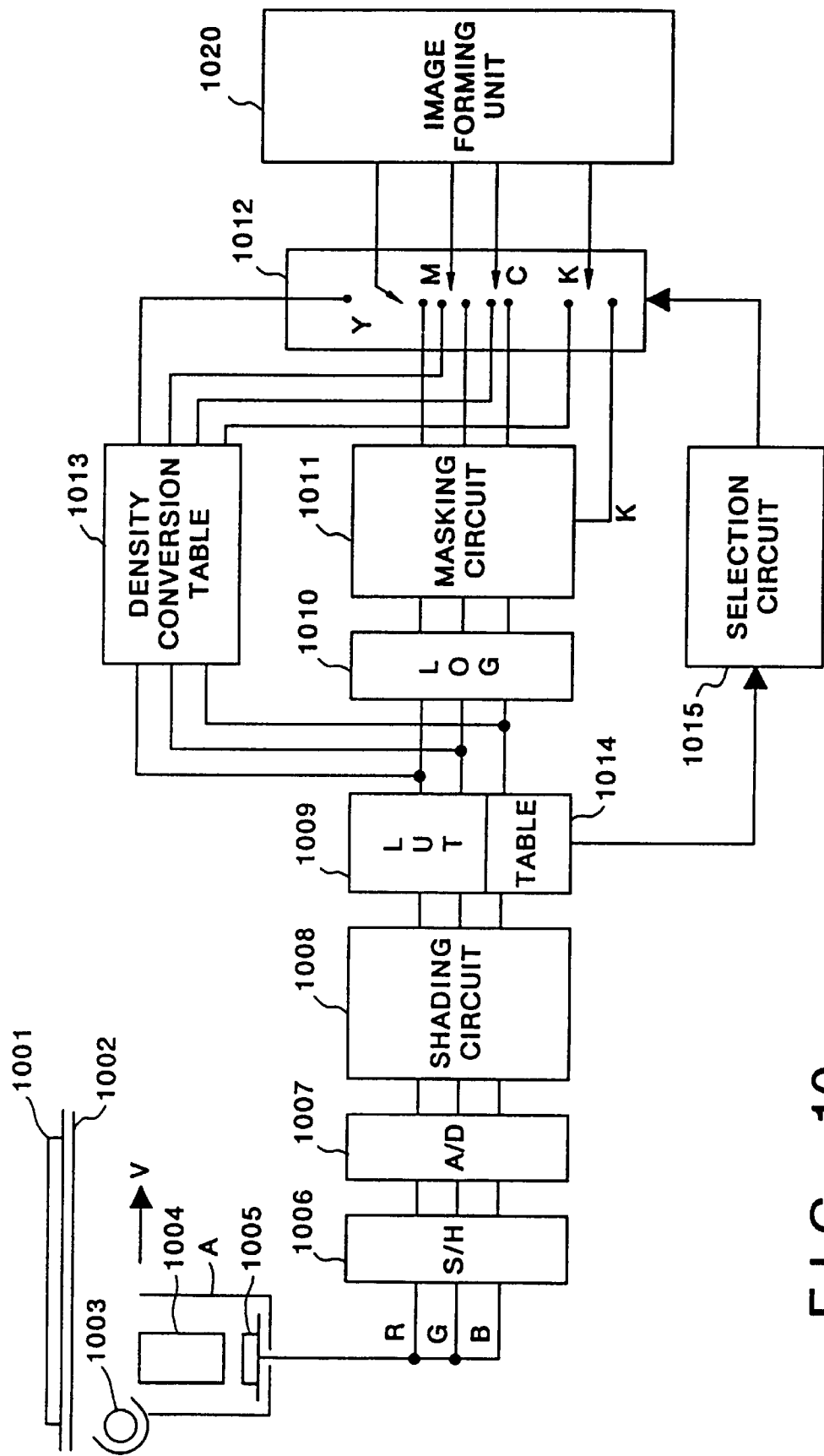
FIG. 10 is a block diagram showing an arrangement of the seventh embodiment according to the present invention.

FIG. 10 is a block diagram showing an arrangement of an embodiment wherein the present invention is applied to a copying apparatus.

As shown in FIG. 10, the copying apparatus of this embodiment comprises three units, i.e., an input apparatus including a sensor unit A for reading a color image, an illumination lamp 1003, and the like, an image processing unit for converting the image input signals read by the input apparatus into image output signals, and an image forming unit 1020 for performing a permanent visual presentation corresponding to a plurality of colors of toners or inks upon reception of the image output signals converted by the image processing unit.

Note that FIG. 10 illustrates only the input apparatus as a means for inputting image signals. However, image signals to be processed by the image processing unit are not limited to a color image original or a printed matter read by the input apparatus. For example, a CG (computer graphic) image, an image picked up by an electronic still camera, and the like can be similarly processed.

The image processing unit comprises the following arrangement.

More specifically, reference numeral 1006 denotes a sample & hold (S/H) circuit for sampling and holding outputs from a CCD sensor 1005 in units of pixels. Reference numeral 1007 denotes an A/D converter; and 1008, a shading circuit for correcting an output nonuniformity caused by a variation in sensitivity among pixels of the CCD sensor 1005, and standardizing inputs to a predetermined number of bits. Reference numeral 1009 denotes a look-up table. The look-up table 1009 includes a table 1014 for storing data for determining whether or not output signals Y, M, C, and K corresponding to input signals R, G, and B are a combination of signals within a color reproduction range obtained by mixing colors of inks or toners by the image forming unit 1020.

Figure 19:
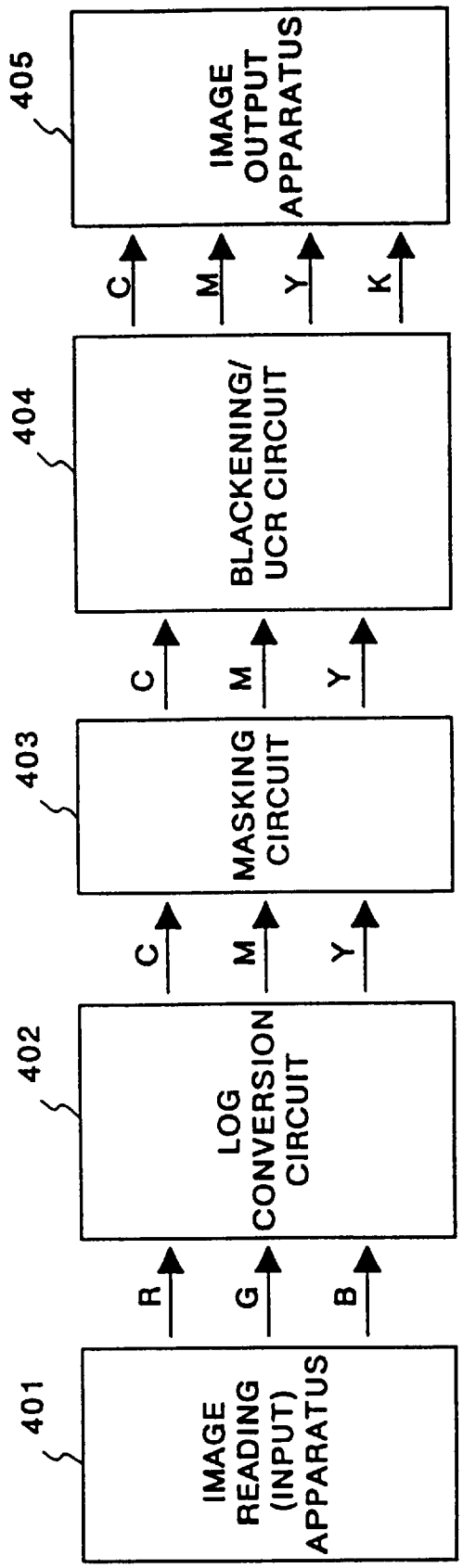
FIG. 19 is a block diagram showing an arrangement of a conventional color reproduction processing unit.
Figure 20:
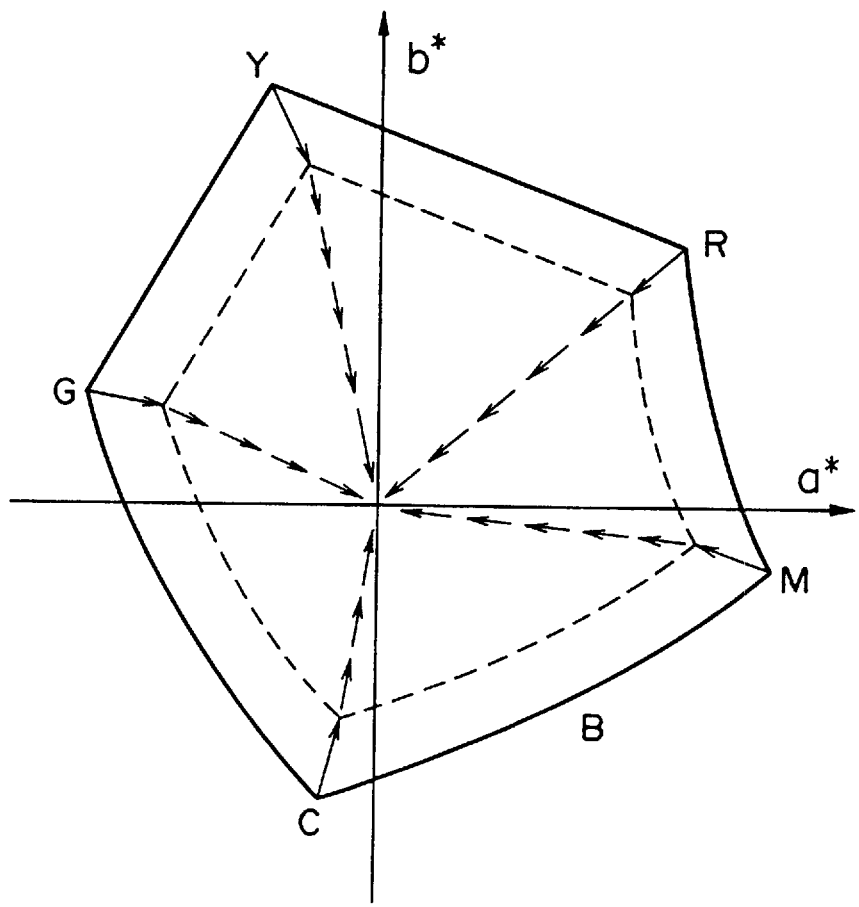
FIG. 20 is a chart showing compression mapping of a color space by the conventional color reproduction processing.

Reference numeral 1010 denotes a log conversion circuit similar to the log conversion circuit 402 shown in FIG. 19; 1011, a masking circuit similar to the masking circuit 403 shown in FIG. 19; 1012, a switching circuit for selecting signals from the masking circuit 1011 or signals from a density conversion table 1013, and sending the selected signals to the image forming unit; and 1013, the density conversion table for converting R, G, and B signals into corresponding Y, M, C, and K signals. Reference numeral 1015 denotes a selection circuit for indicating inputs to be selected to the switching circuit 1012 according to the sign of the output from the look-up table 1009.

The operation of the seventh embodiment with the above arrangement will be described hereinafter.

When a copy start button (not shown) is depressed, an original 1001 on an original table glass 1002 is illuminated with the illumination system 1003. In correspondence with this operation, the sensor unit A (comprising a lens system 1004 including, e.g., a short focus lens array, and a sensor 5100) is moved in a direction of an arrow v so as to perform a prescan operation, thereby sampling image information on the original.

Red (R), green (G), and blue (B) color separation filters are dot-sequentially coated on the CCD sensor 1005. Thus, the sensor 1005 sequentially outputs R, G, and B color separation signals of an original image.

Outputs from the CCD sensor 1005 are analog signals. These analog signals are input to the S/H circuit 1006, and are sampled and held in units of pixels. Thereafter, the analog signals are converted into corresponding digital signals by the A/D converter 1007. Image data converted into the digital signals by the A/D converter 1007 are input to the shading circuit 1008 together with prestored white data (not shown). The output nonuniformity of the image data due to a variation in sensitivity among pixels of the CCD sensor 1005 is corrected, and the corrected image data are standardized to a predetermined number of bits.

When it is determined by the table 1014 of the look-up table 1009 that a combination of the input image signals R, G, and B falls within the color reproduction range of the image forming unit 1020, the sign (+) of the output from the look-up table 1009 is set. On the other hand, when the combination of the input image signals R, G, and B falls outside the color reproduction range of the image forming unit 1020, the sign (−) of the output from the look-up table 1009 is set.

When the output from the look-up table 1009 has the sign (+), the selection circuit 1015 selects the density conversion table 1013, and sends the R, G, and B signals to the density conversion table 1013. Thus, the density conversion table 1013 converts the R, G, and B signalB into the corresponding Y, M, C, and K signals.

The selection circuit then controls the switching circuit 1012 to send signals from the density conversion table 1013 to the image forming unit 1020. The image forming unit 1020 executes a known image forming process, thereby permanently visually presenting a color image corresponding to the input color image signals. For this reason, color reproduction of the output image is substantially equal to the read original in this case.

For example, when a color image original is an output image of the copying apparatus of this embodiment, all the image data are present in the color reproduction region, and the output from the look-up table 1009 has the sign (+).

On the other hand, when the output from the look-up table 1009 has the sign (−), the selection circuit 1015 selects the log conversion circuit 1010 and the masking circuit 1011, and sends the R, G, and B signals to the log conversion circuit 1010. Thus, known color conversion processing is executed to output an image having a gradation characteristic for color coordinates falling outside the color reproduction region.

The selection circuit instructs the switching circuit 1012 to select the signals from the masking circuit 1011, and also controls the switching circuit 1012 to send the signals from the masking circuit 1011 to the image forming unit 1020. The image forming unit 1020 executes a known image forming process, thereby permanently visually presenting a color image corresponding to the input color image signals.

In this manner, even when an input original has color coordinates outside the color reproduction region of the image forming unit 1020, an image having a gradation characteristic can be output.

In the above description, the color conversion processing is selected in accordance with the sign of the output from the look-up table 1009. However, the present invention is not limited to the above embodiment. For example, when the output from the look-up table 1009 has the sign (−), the number of pixels having the sign (−) may be counted by the selection circuit 1015 to make the following control in place of immediately selecting the log conversion circuit 1010 and the masking circuit 1011. That is, when the probability of pixels having the sign (−) in the entire original is 5% or higher, the log conversion circuit 1010 and the masking circuit 1011 may be selected to select the same color processing method as in the conventional apparatus. On the other hand, when the probability is 5% or less, conversion (direct density conversion) for directly obtaining density signals using the look-up table 1009 and the density conversion table 1013 may be performed. In this case, the threshold value is not limited to 5%. An arbitrary threshold value allowing good color reproducibility can be selected according to the processing result.

As described above, according to this embodiment, the look-up table 1009 for determining whether or not input color-separation signals R, G, and B fall within a color reproduction range defined by mixing colors of inks or toners of the image forming unit 1020, is arranged, and the next processing is switched according to the determination result, thereby solving the conventional problems in that the gradation characteristic of an image including only signals allowing color reproduction is impaired or colors of the image are changed by compressing the image by masking for providing the gradation characteristic. Thus, an image allowing color reproduction can be directly subjected to density conversion by switching a density conversion method, and the gradation characteristic can be prevented from being impaired.

As described above, according to the present invention, color reproduction that can maintain a gradation characteristic of a color image original exceeding the color reproduction region of an image output apparatus, or color reproduction faithful to a color image original within the color reproduction region, can be performed, and an optimal output image can be obtained.

An image free from a change in reproduction color can be obtained for repetitive grandchild copies.

[Eighth Embodiment]

The eighth embodiment according to the present invention will be described in detail below with reference to the accompanying drawings.

In the following description, the present invention is applied to a color copying apparatus.

Figure 11:
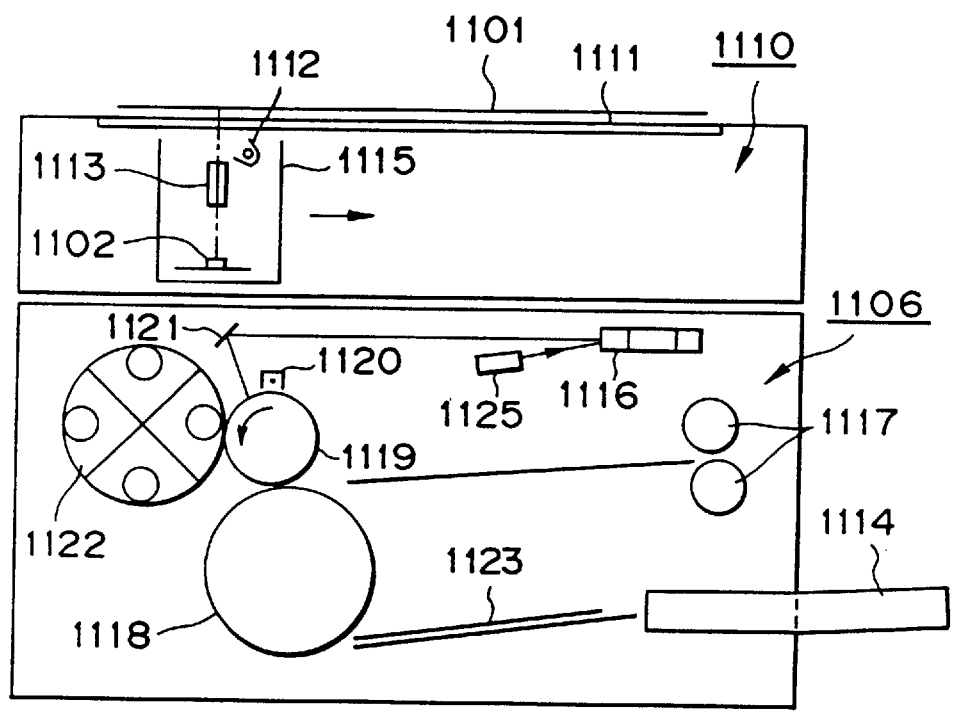
FIG. 11 is a schematic sectional view showing a structure of a color copying machine according to the eighth embodiment of the present invention.
Figure 12:
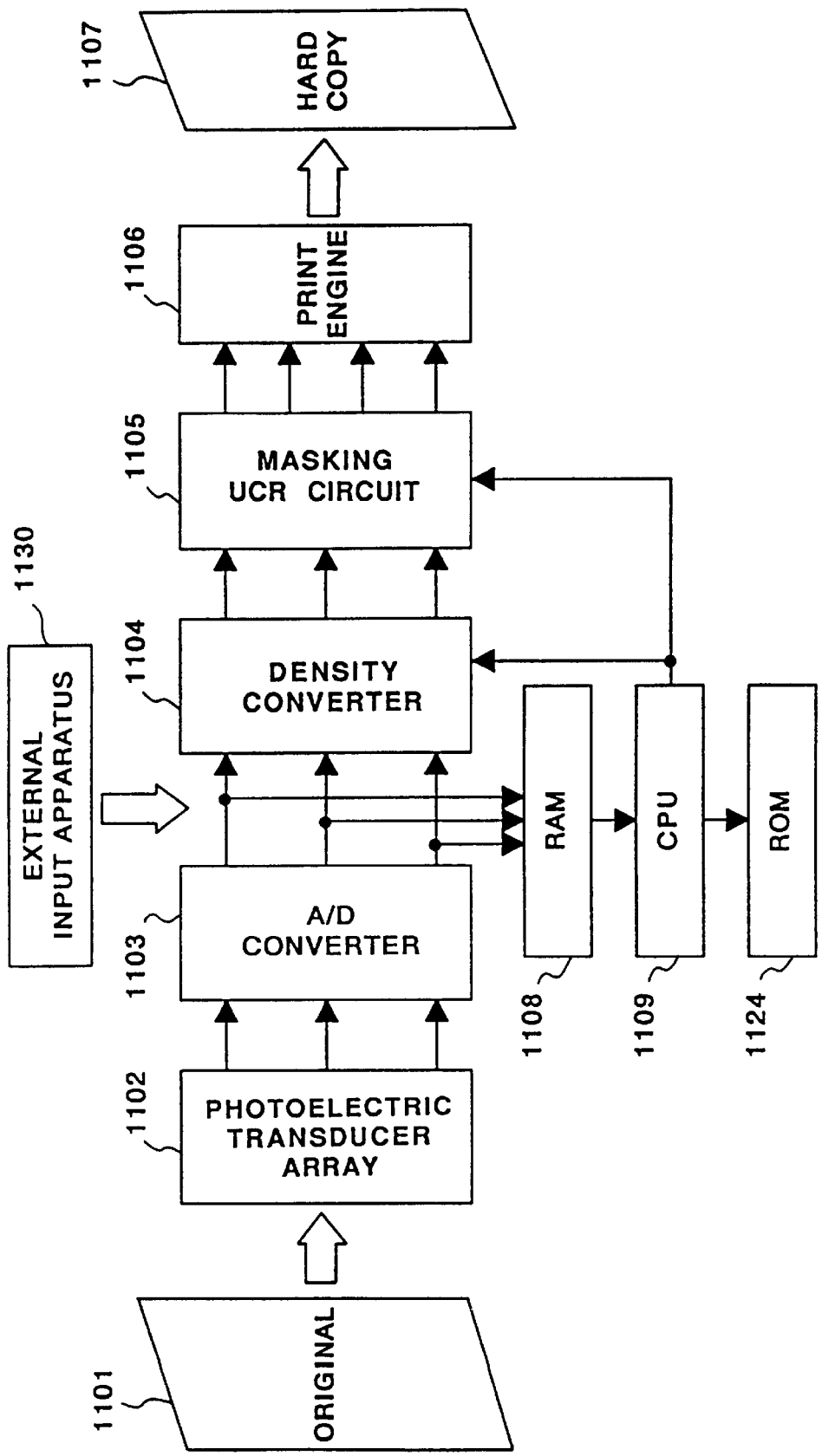
FIG. 12 is a block diagram of an image processing unit of the eighth embodiment.

FIG. 11 is a schematic sectional view showing the structure of the color copying apparatus according to the embodiment of the present invention, and FIG. 12 is a block diagram of an image processing unit of this embodiment.

In FIG. 11, reference numeral 1110 denotes an original reading apparatus; and 1106, an output apparatus (print engine).

The original reading apparatus 1110 outputs color image signals based on the additive color process, expressed by three primary colors, i.e., red (R), green (G), and blue (B), to an image processing unit (to be described later). The output apparatus 1106 receives color image signals based on the subtractive color process, expressed by three primary colors, i.e., yellow (Y), magenta (M), and cyan (C), or four colors obtained by adding black (K) to the three primary colors from the image processing unit of this embodiment, and prints out these image signals.

An original 1101 is placed on an original table glass 1111, and is illuminated with illumination light from an illumination device 1112 of an optical system unit 1115. Light reflected by the original 1101 is focused on a color photoelectric transducer array 1102 via a short-focus lens array 1113. The optical system unit 1115 is moved in a direction of an arrow in FIG. 11 to scan the original 1101 from the left to the right in FIG. 11, thereby reading the original 1101.

An original image read in this manner is converted into electrical signals by the color photoelectric transducer array 1102 (also shown in FIG. 12). The electrical signals are subjected to predetermined color conversion processing in the image processing unit (FIG. 12). Thereafter, the processed signals are printed out by a print engine 1106.

In the print engine 1106, a laser 1125 is driven to emit light in accordance with the color image signals (Y, M, C, and K) color-converted by the image processing unit. Light emitted from the laser 1125 is scanned on a photosensitive drum 1119 by a polygonal mirror 1116, which is rotated at high speed. Thus, an electrostatic latent image corresponding to the laser drive signal is formed on the photosensitive drum 1119. Note that the photosensitive drum 1119 is charged in advance by a charger 1120 before a latent image is formed thereon.

The photosensitive drum 1119 is rotated in a direction of an arrow in FIG. 11, and is developed by a rotary developing unit 1122. Parallel to this operation, a recording sheet 1123 fed from a paper feed cassette 1114 is wound around a transfer drum 1118. An image in the first color is transferred from the developed photosensitive drum 1119 to the blank sheet wound around the transfer drum 1118. Upon completion of the transfer operation, the rotary developing unit is rotated by a ¼ revolution, and transfer operations of a total of four colors are executed. The recording sheet on which images are transferred, is fixed by fixing rollers 117, and is exhausted.

In this manner, a hard copy corresponding to the read original 1101 is obtained.

The arrangement of the print engine 1106 is substantially the same as that of the image output apparatus 103, a detailed description of which is omitted in the above embodiments.

A color conversion processing unit of this embodiment with the above arrangement will be described below with reference to FIG. 12.

In FIG. 12, the same reference numerals denote the same parts as in FIG. 11, and a detailed description thereof will be omitted.

In FIG. 12, reference numeral 1103 denotes an A/D converter for converting analog electrical signals from the color photoelectric transducer array 1102 into corresponding digital signals; 1104, a density converter for performing density conversion processing of input color image signals; and 1105, a masking•UCR circuit.

Figure 13:
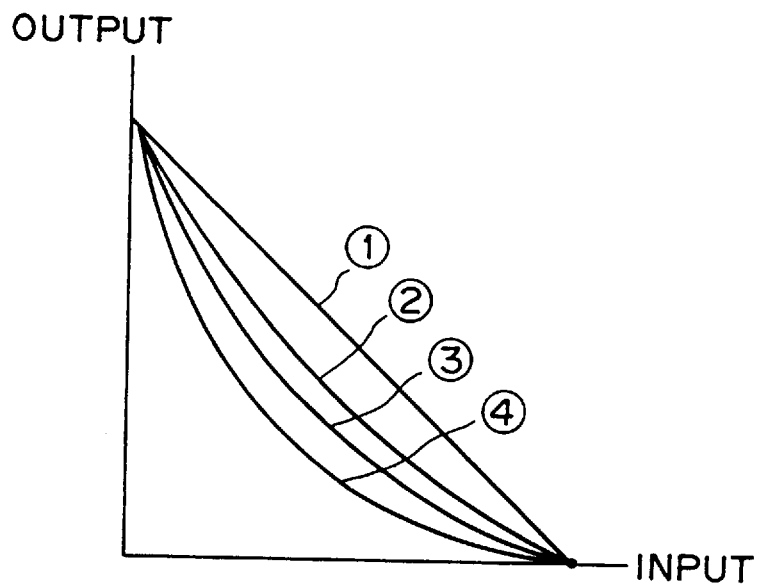
FIG. 13 is a graph showing density conversion curves used in the eighth embodiment.

In the density converter 1104 of this embodiment, a plurality of curve tables (e.g., ① to ④) are prepared, as shown in FIG. 13.

In the masking•UCR circuit 1105, a plurality of sets of masking coefficients corresponding in number to the curve tables are prepared. Note that masking coefficients mean, e.g., a 3×3 matrix, and a total of nine coefficients form one set.

Reference numeral 1108 denotes a RAM for temporarily storing digital image signals; 1109, a CPU for controlling the overall apparatus of this embodiment according to a control sequence (FIG. 14; to be described later) stored in a ROM 1124; and 1124, the ROM for storing the above-mentioned program, a color space which can be output by the print engine 1106, and the like.

The color space which can be output by the print engine 1106 is obtained by storing colors of hard copies as L*, a*, and b* values obtained by inputting various combinations of Y (yellow), M (magenta), C (cyan), and K (black) signals to the print engine 1106. The color space represents $L'^*_i$, $a'^*_i$, and $b'^*_i$ values (i is the color number of a hard copy) falling within the color reproduction region of the print engine 1106.

In this embodiment, input digital image signals are not limited to image signals from the reading apparatus 1110. For example, image signals from an external input apparatus 1130 can be input, and can be printed out by the print engine 1106 as a corresponding image. In this case, the input image signals from the external input apparatus 1130 or outputs from the A/D converter 1103 are selected, and the selected inputs are input to the density converter 1104 or the RAM 1108.

Note that the external input apparatus 1130 comprises, e.g., a computer, an SV (still video) camera, a video apparatus, or the like.

Figure 14:
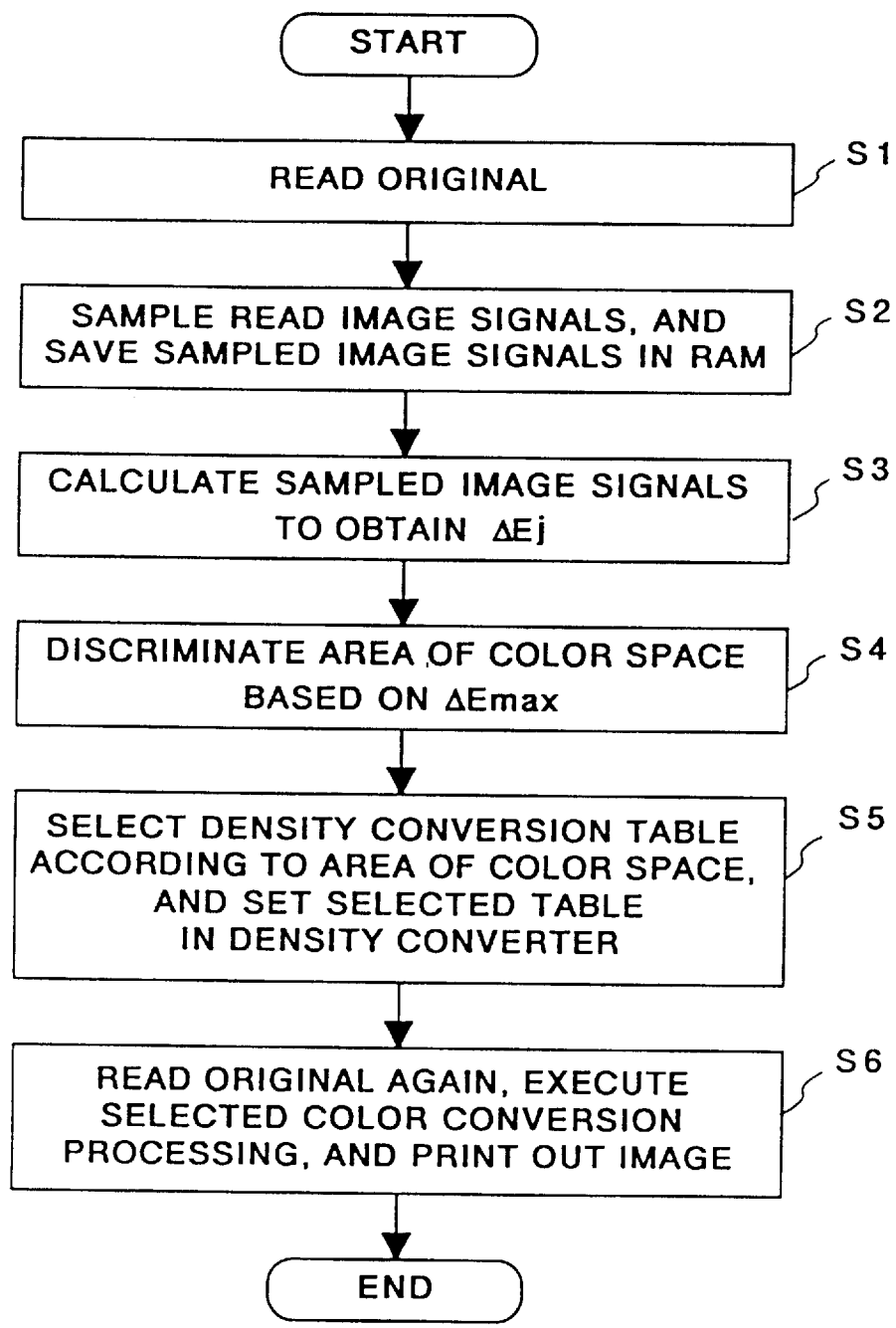
FIG. 14 is a flow chart showing color conversion processing of the eighth embodiment.

Color conversion processing of the apparatus of this embodiment with the above arrangement will be described below with reference to the flow chart shown in FIG. 14.

In step S1, the original 1101 is read by the original reading apparatus 1110. The read original color image based on the additive color process, expressed by three primary colors, i.e., red (R), green (G), and blue (B), is converted into corresponding analog electrical signals by the color photoelectric transducer array 1102. The analog signals are supplied to the A/D converter 1103. The A/D converter 1103 converts the analog signals from the color photoelectric transducer array 1102 into corresponding digital signals. For this reason, the CPU 1109 samples some input color image signals, and temporarily saves them in the RAM 1108 in step S2.

Figure 15:
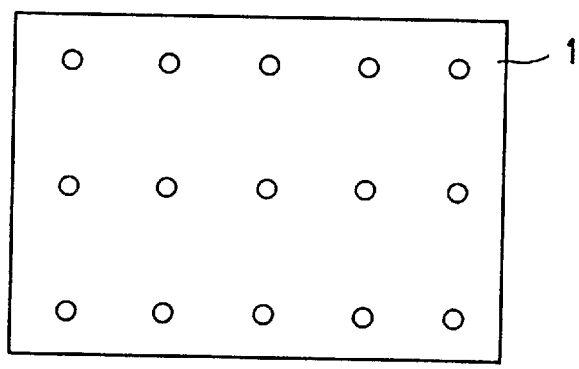
FIG. 15 is a view showing sampled original image signals in the eighth embodiment.

For example, as shown in FIG. 15, components indicated by ○ of the input color image signals are sampled, and are saved in the RAM 1108.

In step S3, the CPU 1109 calculates and discriminates the saved image signals. More specifically, the CPU executes the following procedure.

R, G, and B image signals are converted into L*, a*, and b* signals. The L*, a*, and b* signals represent a uniform color space (determined by the CIE in 1976).

The values are represented by $L^*_j$, $a^*_j$, and $b^*_j$ (j is the sampling number). Then, a minimum difference ΔE between $L'^*_i$, $a'^*_i$, and $b'^*_i$ values (i is the color number of a hard copy), and L*, a*, and b* values obtained by sampling and converting the image signals is obtained for each image signal j:

$$\Delta E^2_j = (L^*_j - L'^*_i)^2 + (a^*_j - a'^*_i)^2 + (b^*_j - b'^*_i)^2$$

In step S4, a maximum one of the differences $\Delta E_j$ obtained in step S3 is obtained, and is represented by $\Delta E_{max}$.

In step S5, the area of the actual color space as compared to the color space which can be output by the print engine is discriminated based on $\Delta E_{max}$ and an optimal curve table is selected from the density conversion table shown in FIG. 13 on the basis of the discrimination result. More specifically, when $\Delta E_{max}$ is small, the curve table ④ is selected, and as $\Delta E_{max}$ becomes smaller, the tables ③, ②, and ① are selected in turn.

The selected curve table is set in the density converter 1104. At the same time, a plurality of sets of masking coefficients corresponding in number to the curve table set in the density converter 1104 are set in the masking•UCR circuit 1105, so that color conversion processing is executed by a plurality of kinds of processing methods.

In this manner, upon completion of selection of the color conversion processing corresponding to the image signals sampled and saved in the RAM 1108, the original reading apparatus 1110 begins to read the original again in step S6. The read image is subjected to the selected color conversion processing, and is output to the print engine 1106, thus obtaining a hard copy.

More specifically, an image read by the photoelectric transducer array 1102 shown in FIG. 11 is converted into corresponding digital signals by the A/D converter 1103. R (red), G (green), and B (blue) color signals are color-converted into C, M, and Y color signals in accordance with the curve table set in the density converter 1104, and the C, M, and Y signals are converted into Y (yellow), M (magenta), C (cyan), and K (black) signals by removing color muddiness by the masking•UCR circuit 1105. The color-converted color image signals are supplied to the print engine 1106, and a color hard copy 1107 is obtained.

As described above, according to this embodiment, the number of colors of input signals, and the number of post-processing colors are counted, and color conversion processing having the smallest difference between the numbers of colors is selected according to the count results. As a result, optimal color conversion processing can be executed according to an input image, and the best output can be obtained.

In the above description, the curve tables shown in FIG. 13 are prepared in the density conversion table 1104, and one of these tables is selected by the CPU 1109. However, the present invention is not limited to the above embodiment. For example, the curve tables shown in FIG. 13 may be prepared in the CPU 1109 or in the ROM 1124, and may be set in the density converter 1104 by the CPU 1109. The CPU 1109 may calculate an optimal curve table, and set the calculated table in the density converter 1104, thus obtaining the same effect as described above.

In the above description, the masking coefficients of the masking•UCR circuit 1105 are changed in correspondence with the curves of the density converter 1104 in accordance with $\Delta E_{max}$. However, constant masking coefficients of the masking•UCR circuit 1105 may be used to obtain a good print result. Similarly, nine masking coefficients (if a 3×3 matrix is adopted) may be independently changed and selected according to $\Delta E_{max}$ in place of being combined with the curves of the density converter 1104.

In this arrangement, a good print result can be obtained.

Furthermore, in the above-mentioned selection, an average value of $\Delta E_j$ may be used in place of $\Delta E_{max}$.

Furthermore, as an input apparatus, the external input apparatus, e.g., a CG (computer graphic) image from a computer, an image input from an SV (still video) camera, a video, or the like may be used. In this case, these signals are input after the A/D converter, as shown in FIG. 11. The CG image can be directly input since it is expressed by digital signals. However, the video input must be converted into digital signals in advance. After these signals are input, they are processed in the same manner as an original input.

The present invention is not limited to the color copying apparatus, but may be applied to a color image processing apparatus.

As described above, according to the present invention, since a means for detecting a color range of an input image, and a means for changing processing according to the detected color range are arranged, a good color conversion result can be obtained for images in every color ranges.

[Ninth Embodiment]

The ninth embodiment according to the present invention will be described below with reference to the accompanying drawings.

Figure 16:
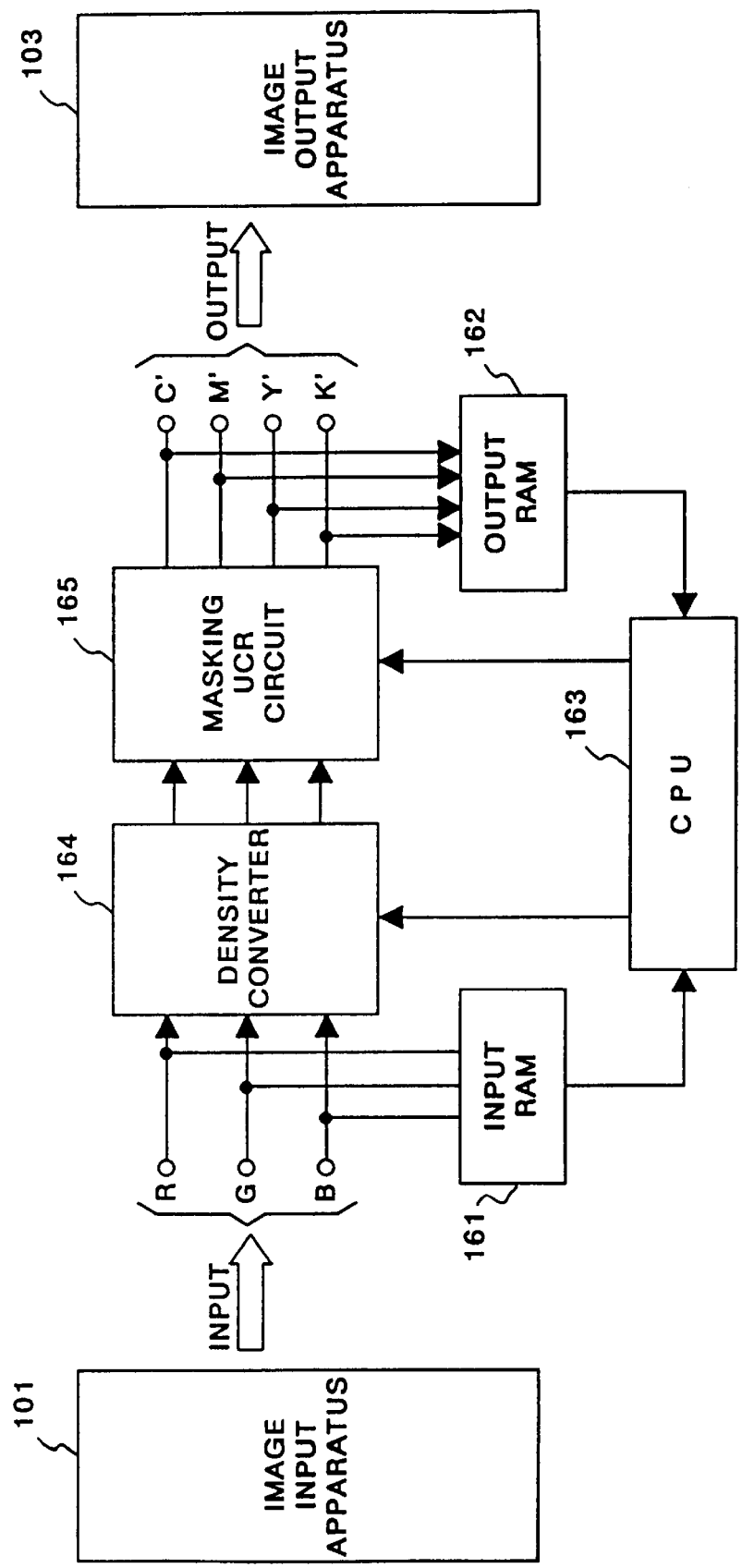
FIG. 16 is a block diagram showing an arrangement of the ninth embodiment according to the present invention.

FIG. 16 is a block diagram of the ninth embodiment according to the present invention.

In FIG. 16, the same reference numerals denote the same parts as in FIG. 1, and a detailed description thereof will be omitted.

In FIG. 16, reference numeral 161 denotes an input RAM for temporarily storing input color image signals, and the like; 162, an output RAM for temporarily storing converted output color image signals, and the like; 163, a CPU for controlling the overall apparatus of this embodiment according to an internal program; 164, a density converter for performing density conversion processing of input color image signals; and 165, a masking-UCR circuit.

The density converter 164 and the masking•UCR circuit 165 of this embodiment have the same arrangement as that of the density converter 1104 and the masking•UCR circuit 1105 in the eighth embodiment. In the density converter 1104, a plurality of curve tables (e.g., ① to ④) are prepared, as shown in FIG. 13. In the masking•UCR circuit 165, a plurality of sets of masking coefficients corresponding in number to the curve tables are prepared.

Figure 17:
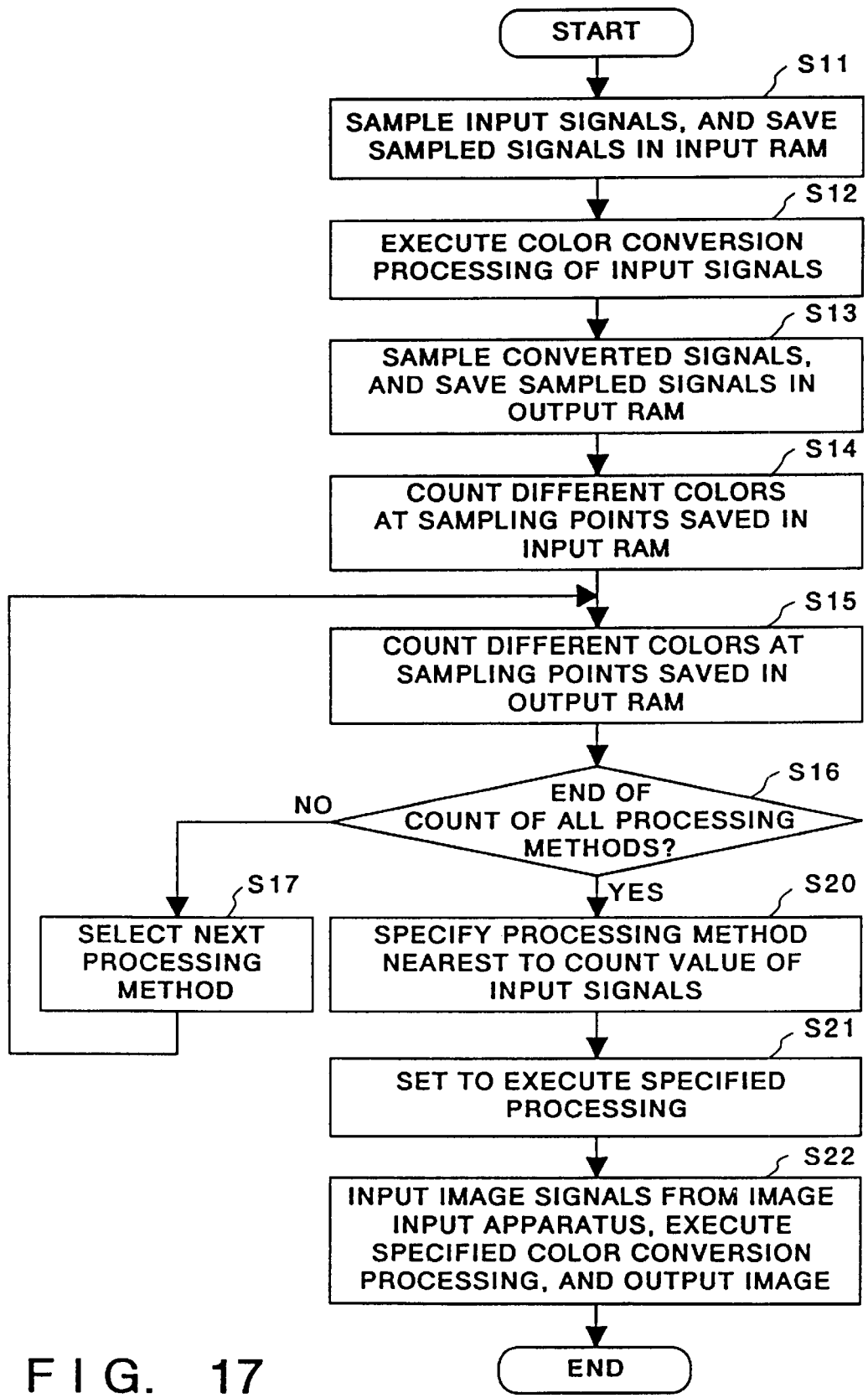
FIG. 17 is a flow chart showing color conversion processing of the ninth embodiment.

Color conversion processing of the apparatus of this embodiment with the above arrangement will be described below with reference to the flow chart shown in FIG. 17.

In step S11, when color image signals based on the additive color process, expressed by three primary colors, i.e., red (R), green (G), and blue (B), are input from an image input apparatus 101, the CPU 163 samples some components of the input color image signals, and temporarily saves them in the input RAM 161. For example, as shown in FIG. 15, components indicated by ○ of the input color image signals are sampled, and are saved in the input RAM 161.

In step S12, the input image signals are color-converted into color image signals based on the corresponding substractive color process by the densigy converter 164 and the masking•UCR circuit 165. The color conversion processing is executed by a plurality of kinds of processing methods using some or all of the plurality of curve tables of the density converter 164 shown in FIG. 13, and the plurality of sets of masking coefficients of the masking•UCR circuit 165 corresponding in number to the curve tables.

At this time, the converted color image signals corresponding to the sampling points of the input color image signals, as shown in FIG. 15, are sampled in step S13, and are saved in the output RAM 162. In this case, sampled data are saved in units of all the kinds of processing methods.

In step S14, the number of sets of R, G, and B signals having different signal values at the sampling points saved in the input RAM 161 is counted. The sets of R, G, and B signals having different signal values mean different colors. The count value is represented by $C_0$.

In step S15, the number of sets of color-converted Y, M, C, and K signals having different signal values at the sampling points and saved in the output RAM 162 in the first color conversion processing method is counted. The count value is represented by $C_1$.

In step S16, it is checked if the color count processing is executed for data at the sampling points in all the color conversion processing methods executed in step S13. If NO in step S16, the flow advances to step S17.

In step S17, the next color conversion processing method is selected to count the sampling points. The flow then returns to step S15, and a count operation of the sampling points in the next processing method is started.

In this manner, the numbers of sets of Y, M, C, and K signals having different signal values obtained in the different processing methods are respectively represented by, e.g., $C_2$, $C_3$, and $C_4$. The values $C_1$ to $C_4$ are equal to or smaller than $C_0$.

In this manner, the sampling points of the color conversion processing operations by the different processing methods are sequentially conted. If these operations are completed for all the processing methods, the flow advances from step S16 to step S20. In step S20, of the count values $C_1$ to $C_4$ of the processing methods, a value nearest to the count value $C_0$ of the sampling points of the input color image signals is obtained.

If $C_i$ is obtained, it is determined that processing for obtaining $C_i$ is best suitable for an input image. For this reason, the CPU 163 sets the density converter 164 and the masking•UCR circuit 165 to execute the ith processing method in step S21.

Upon completion of the setting operation, in step S22, color image signals are input again from the image input apparatus, and are color-converted by the selected color conversion processing. More specifically, R (red), G (green), and B (blue) color signals are color-converted into C, M, and Y color signals by the density converter 164, and the C, M, and Y color signals are converted into Y (yellow), M (magenta), C(cyan), and K (black) signals by removing color muddiness by the masking•UCR circuit 165. The color-converted color image signals are output to the image output apparatus 103.

As described above, according to this embodiment, the number of colors of input signals, and the number of post-processing colors of input signals, and the number of post-processing colors are counted, and color conversion processing having the smallest decrease in the number of colors is selected, so that optimal color conversion processing can be executed in accordance with an input image, and the best output can be obtained.

[Tenth Embodiment]

In the ninth embodiment described above, the CPU 163 sets the best processing method in the density converter 164 and the masking•UCR circuit 165, and color conversion processing is executed based on the set processing method. However, the present invention is not limited to the above embodiment. For example, a plurality of color conversion processing operations may be executed at the same time, and only signals converted by the optimal color conversion processing may be selected from those converted by these color conversion processing operations, thus obtaining the same effect as described above.

Figure 18:
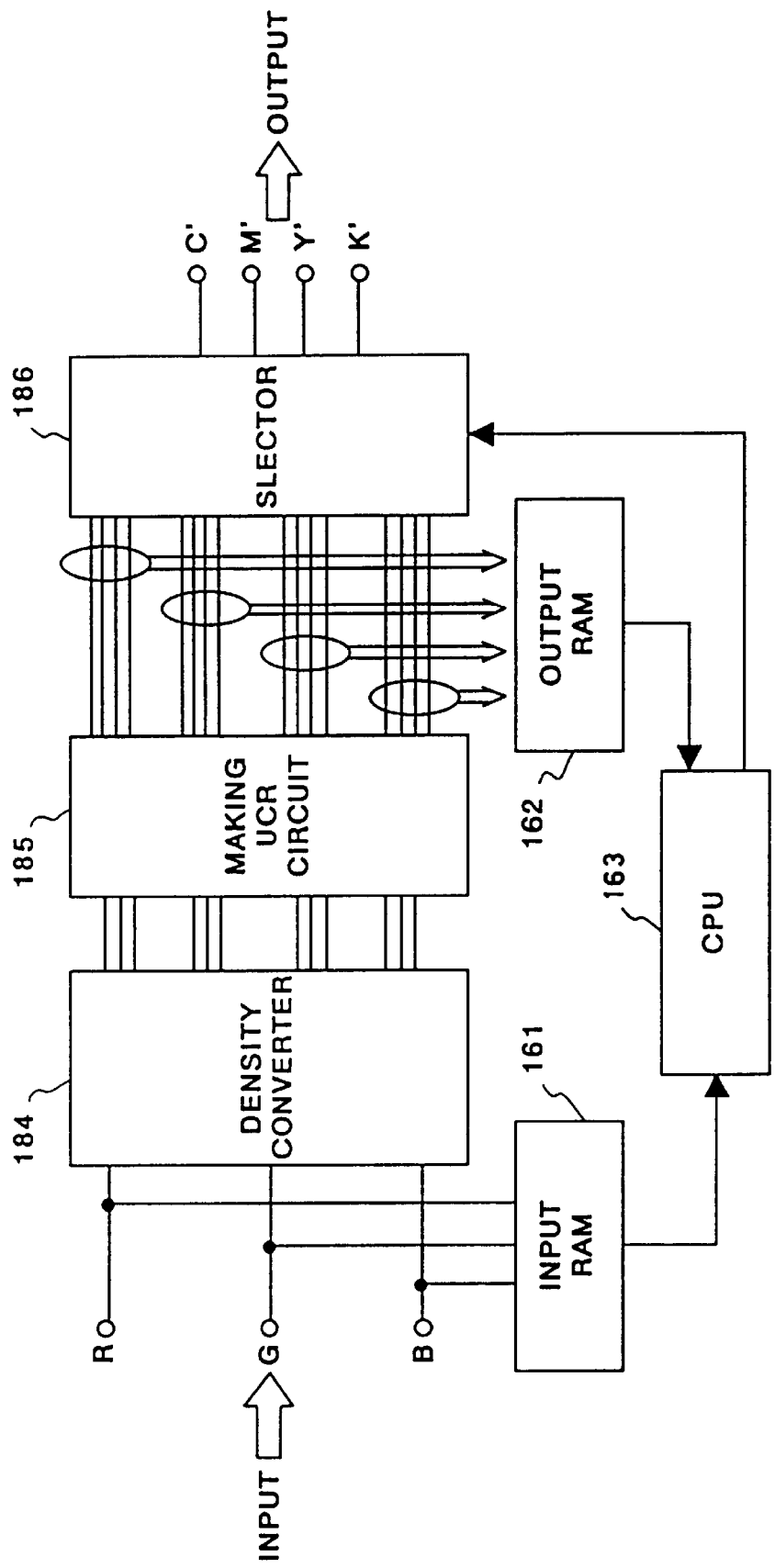
FIG. 18 is a block diagram showing an arrangement of the tenth embodiment according to the present invention.

FIG. 18 shows the arrangement of the tenth embodiment according to the present invention.

In FIG. 18, a selector 186 is added to the circuit of the ninth embodiment shown in FIG. 16, and a density converter 184 and a masking•UCR circuit 185 can simultaneously execute a plurality of color conversion processing operations.

Other arrangements are the same as those in the ninth embodiment shown in FIG. 16, and the control operation is also the same as that in the ninth embodiment.

In the tenth embodiment, a CPU 163 may supply a select signal to the selector 186 on the basis of a comparison/discrimination result of count values of the numbers of sets having different signal values by the CPU 163 so as to select the best color.

When the same count values are obtained upon discrimination, a value having a smaller suffix is selected. For example, when $C_1$ and $C_2$ are nearest to $C_0$ and are equal to each other, $C_1$ is selected.

Alternatively, as masking coefficients have smaller suffixes, diagonal components $a_{11}$, $a_{22}$, and $a_{33}$ may become close to 1 as follows.

$$\begin{pmatrix} Y' \\ M' \\ C' \end{pmatrix} = \begin{pmatrix} a_{11} & & \\ & a_{22} & \\ & & a_{33} \end{pmatrix} \begin{pmatrix} Y \\ M \\ C \end{pmatrix}$$

Furthermore, color conversion processing may be selected using only a plurality of numbers of different post-processing colors without using the number of different pre-processing colors. The largest one of the numbers of different post-processing colors may be selected.

It is effective to execute the above-mentioned processing method selection algorithm of each of the above embodiments in such a prescan operation as shown in FIG. 21.

More specifically, in a color copying machine, when an original is placed on an original table, and a copy start key is depressed, a prescan operation prior to an actual printing operation is normally executed so as to detect, e.g., an original size. In this case, the above-mentioned algorithm is executed, so that an optimal processing sequence can be executed in the main scan mode.

As described above, according to the present invention, a means for counting the number of colors of input signals, and the number of colors after color conversion processing is arranged, and processing having the smallest decrease in the number of colors is selected according to the count results. Thus, an optimal processing method can be selected according to an input image, and a good color-conversion output can be obtained.

Each of the above embodiments can be applied to any copying operations capable of performing color image formation in, e.g., a leaser beam printer, an ink-jet printer, and the like.

The image output apparatus 103 may comprise an electrophotography type laser printer, a sublimation type thermal transfer printer, or any ink-jet type printer.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus comprising:

input means for inputting color image data representing a color image of interest;

memory means for storing a color gamut of an output device, represented with a hexahedron comprising substantially red, green, blue, cyan, magenta, yellow, white and black color-component points;

extraction means for extracting a color gamut of the color image of interest and for determining whether or not the color gamut of the color image of interest is within the color gamut of the output device; and color-gamut mapping means for mapping the color image data based on the result from extraction by the extraction means, wherein said color-gamut mapping means performs mapping in a set mapping mode based on the result from the extraction by said extraction means, and wherein said color-gamut mapping means performs mapping in a first mode in which color image data is reproduced within a color gamut of an output device with high fidelity, or performs mapping in a second mode, if the color image includes color image data outside of the color gamut of the output device, in which color image data is color-gamut-mapped so as to maintain contrast of the color image.

2. The color image processing apparatus according to claim 1, wherein said extraction means extracts the color gamut of the color image of interest at prescanning time.

3. The color image processing apparatus according to claim 1, further comprising:

a scanner for inputting the color image data; and image formation means for forming an image based on the color image data mapped by said color-gamut mapping means.

4. The color image processing apparatus according to claim 1, wherein said color-gamut mapping means uses a look-up table for mapping the color image data.

5. The color image processing apparatus according to claim 1, wherein said color-gamut mapping means performs a matrix operation for mapping the color image data.

6. The color image processing apparatus according to claim 1, wherein said extraction means extracts color distribution of the color image data.

7. A color image processing apparatus comprising:

input means for inputting color image data representing a color image of interest;

selection means for selecting one of plural mapping modes; and mapping means for color-gamut mapping the color image data based on the mapping mode selected by said selection means, wherein said plural mapping modes include:
    a first mode for reproducing the color image data within a color gamut of an output device so that the color image data has a high fidelity;
    a second mode for mapping color image data outside of the color gamut of the output device into the color gamut of the output device; and
    a third mode for mapping the color image data so as to enlarge a gamut of the color image of interest.

8. The color image processing apparatus according to claim 7, wherein the third mode is directed to a map image.

9. The color image processing apparatus according to claim 7, wherein said selection means selects a mapping mode in accordance with manual operation.

10. The color image processing apparatus according to claim 7, wherein said selection means automatically selects a mapping mode.

11. The color image processing apparatus according to claim 7, wherein in the first mode, a look-up table is used for mapping the color image data.

12. The color image processing apparatus according to claim 7, wherein in the second mode, a matrix operation is performed for mapping the color image data.

13. The color image processing apparatus according to claim 7, wherein in the second mode, one of plural color-gamut mapping methods is used in correspondence with the color gamut of the color image data.

14. The color image processing method according to claim 7, further comprising image formation means for forming an image based on the color image data mapped by said color-gamut mapping means.

15. A color image processing apparatus comprising:

input means for inputting color image data representing a color image of interest;

memory means for storing color-gamut mapping data corresponding to a plurality of color gamuts;

extraction means for extracting information on a color gamut of the color image of interest;

setting means for automatically setting the color-gamut mapping data based on the information on the color gamut of the image data; and color-gamut mapping means for mapping the color image data based on the color-gamut mapping data set by said setting means.

16. The color image processing apparatus according to claim 15, wherein the color-gamut mapping data is indicative of matrix coefficients.

17. The color image processing apparatus according to claim 15, wherein said extraction means extracts the color gamut of the image data at prescanning time.

18. The color image processing apparatus according to claim 15, wherein the color-gamut mapping data is indicative of a look-up table.

19. The color image processing method according to claim 15, further comprising image formation means for forming an image based on the color image data mapped by said color-gamut mapping means.

20. A color processing method comprising:

an input step of inputting color image data representing a color image interest;

a selection step of selecting one of plural mapping modes; and a mapping step of mapping the color image data based on the mapping mode selected in said selection step, wherein said plural mapping modes include:
    a first mode for reproducing color image data with a high fidelity within a color gamut of an output device;
    a second mode for mapping color image data outside of the color gamut of the output device into the color gamut of the output device; and
    a third mode for mapping the color image data so as to enlarge a gamut of the color image of interest.

21. A color image processing method comprising:

an input step of inputting color image data representing a color image of interest;

a memory step of storing color-gamut mapping data corresponding to a plurality of color gamuts;

an extraction step of extracting information on a color gamut of the color image of interest;

a setting step of automatically setting the color-gamut mapping data based on the information on the color gamut of the image data; and a color gamut mapping step of mapping the color image data based on the color-gamut mapping data set in said setting step.

* * * * *

UNITED STATES PATENT AND TRADEMARK OFFICE
CERTIFICATE OF CORRECTION

PATENT NO. : 5,844,699
DATED : Dec. 1, 1998
INVENTOR(S) : Akihiro Usami et al.

It is certified that error appears in the above-identified patent and that said Letters Patent is hereby corrected as shown below:

COLUMN 1

Line 5, "Ser. No. 07/772,154" should read --Ser. No. 07/792,154--.

COLUMN 21

Line 29, "signalB" should read --signals--.

COLUMN 26

Line 33, "densigy" should read --density--.

COLUMN 28

Line 31, "leaser" should read --laser--.

UNITED STATES PATENT AND TRADEMARK OFFICE
CERTIFICATE OF CORRECTION

PATENT NO. : 5,844,699
DATED : Dec. 1, 1998
INVENTOR(S) : Akihiro Usami, et al.

It is certified that error appears in the above-identified patent and that said Letters Patent is hereby corrected as shown below:

COLUMN 30

Line 27, please insert --image-- after "color".

Line 29, please insert --of-- after "image".

Signed and Sealed this

Twenty-seventh Day of July, 1999

Attest:

Q. TODD DICKINSON

Attesting Officer

Acting Commissioner of Patents and Trademarks